US011441294B2

(12) United States Patent
Kawamoto et al.

(10) Patent No.: US 11,441,294 B2
(45) Date of Patent: Sep. 13, 2022

(54) MEASUREMENT SYSTEM, WORK MACHINE, AND MEASUREMENT METHOD

(71) Applicant: Komatsu Ltd., Tokyo (JP)

(72) Inventors: Shun Kawamoto, Tokyo (JP);
Hiroyoshi Yamaguchi, Tokyo (JP);
Taiki Sugawara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 268 days.

(21) Appl. No.: 16/332,829

(22) PCT Filed: Oct. 30, 2017

(86) PCT No.: PCT/JP2017/039193
§ 371 (c)(1),
(2) Date: Mar. 13, 2019

(87) PCT Pub. No.: WO2018/079789
PCT Pub. Date: May 3, 2018

(65) Prior Publication Data
US 2019/0360174 A1 Nov. 28, 2019

(30) Foreign Application Priority Data
Oct. 31, 2016 (JP) .............................. JP2016-213700

(51) Int. Cl.
*E02F 9/26* (2006.01)
*B60R 1/00* (2022.01)
(Continued)

(52) U.S. Cl.
CPC ............... *E02F 9/24* (2013.01); *G01B 11/24* (2013.01); *G06T 7/593* (2017.01); *G06T 7/77* (2017.01);
(Continued)

(58) Field of Classification Search
CPC ... E02F 9/24; G06T 7/77; G06T 7/593; G06T 2207/10012; G06T 2207/30164; G01B 11/24
See application file for complete search history.

(56) References Cited

U.S. PATENT DOCUMENTS 9,300,954 B2    3/2016  Tanizumi et al.
9,481,984 B2   11/2016  Iwamura et al.
(Continued)

FOREIGN PATENT DOCUMENTS

CN   103528571 A   1/2014
CN   104048607 A   9/2014
(Continued)

OTHER PUBLICATIONS

International Search Report dated Jan. 30, 2018, issued for PCT/JP2017/039193.

*Primary Examiner* — Adam D Tissot
*Assistant Examiner* — Laura E Linhardt
(74) *Attorney, Agent, or Firm* — Locke Lord LLP

(57) ABSTRACT

A measurement system includes an imaging unit mounted to a swing body of a work machine to image a shape around the work machine, a position detection unit which determines a position of the swing body, an imaging unit position calculation unit which calculates a position of the imaging unit when the imaging unit performs imaging while the swing body swings, and a three-dimensional position calculation unit which determines a three-dimensional position around the work machine during the imaging, on the basis of a position of the imaging unit calculated by the imaging unit position calculation unit.

10 Claims, 10 Drawing Sheets

(51) Int. Cl.
  *E02F 9/20* (2006.01)
  *E02F 9/24* (2006.01)
  *G06T 7/77* (2017.01)
  *G06T 7/593* (2017.01)
  *G01B 11/24* (2006.01)

(52) U.S. Cl.
  CPC ............... *G06T 2207/10012* (2013.01); *G06T 2207/30164* (2013.01)

(56) References Cited

U.S. PATENT DOCUMENTS

| | | | |
|---|---|---|---|
| 10,118,553 | B2 | 11/2018 | Matsuo et al. |
| 10,233,615 | B2 | 3/2019 | Yamaguchi et al. |
| 2008/0309784 | A1 | 12/2008 | Asari et al. |
| 2012/0327261 | A1 | 12/2012 | Tafazoli Bilandi et al. |
| 2015/0168136 | A1 | 6/2015 | Kamat et al. |
| 2015/0170367 | A1 | 6/2015 | Nachman |
| 2015/0249821 | A1 | 9/2015 | Tanizumi et al. |
| 2016/0281334 | A1 | 9/2016 | Iwamura et al. |
| 2016/0312446 | A1 | 10/2016 | Pettersson et al. |
| 2016/0348343 | A1* | 12/2016 | Kanemitsu ............... E02F 9/123 |
| 2017/0028922 | A1 | 2/2017 | Matsuo et al. |
| 2017/0061689 | A1* | 3/2017 | Petrany ................. G06T 19/006 |
| 2017/0107698 | A1 | 4/2017 | Yamaguchi et al. |
| 2017/0146343 | A1 | 5/2017 | Matsuo et al. |
| 2017/0284071 | A1 | 10/2017 | Yamaguchi et al. |
| 2018/0051446 | A1* | 2/2018 | Yoshinada ............... E02F 9/205 |
| 2018/0274915 | A1* | 9/2018 | Tsurumi ............... H04N 5/23296 |

FOREIGN PATENT DOCUMENTS

| | | | | |
|---|---|---|---|---|
| CN | 104662389 | A | | 5/2015 |
| CN | 105121753 | A | | 12/2015 |
| CN | 105518228 | A | | 4/2016 |
| CN | 106029994 | A | | 10/2016 |
| DE | 112015000126 | T5 | | 5/2016 |
| JP | 2004-163139 | A | | 6/2004 |
| JP | 2006250917 | A | * | 9/2006 |
| JP | 2008-312004 | A | | 12/2008 |
| JP | 2013-036243 | A | | 2/2013 |
| WO | WO-2014046213 | A1 | * | 3/2014 ........... G01B 11/026 |
| WO | 2015/162710 | A1 | | 10/2015 |
| WO | 2015/198410 | A1 | | 12/2015 |
| WO | 2016/148309 | A1 | | 9/2016 |

* cited by examiner

MEASUREMENT SYSTEM, WORK MACHINE, AND MEASUREMENT METHOD

FIELD

The present invention relates to a measurement system, a work machine, and a measurement method which measure the surrounding of the work machine.

BACKGROUND

Work machines have imaging devices. Patent Literature 1 describes a technology for creating construction plan image data on the basis of construction plan data stored in a storage unit and positional information of a stereo camera, superimposing the construction plan image data on current image data captured by the stereo camera to have a composite image, and three-dimensionally display the superimposed composite image on a three-dimensional display device.

CITATION LIST

Patent Literature

Patent Literature 1: Japanese Patent Application Laid-Open No. 2013-036243 A

SUMMARY

Technical Problem

There has been a desire to widely measure the surrounding shape around a work machine. Patent Literature 1 does not describe or suggest wide range measurement of the surrounding shape around a work machine, and there is room for improvement.

An object of the present invention is to widely measure the surrounding shape around a work machine.

Solution to Problem

According to a first aspect of the present invention, a measurement system comprises: an imaging unit mounted to a swing body of a work machine to image a shape around the work machine; a position detection unit which determines a position of the swing body; an imaging unit position calculation unit which calculates a position of the imaging unit when the imaging unit performs imaging during swinging operation of the swing body; and a three-dimensional position calculation unit which determines a three-dimensional position around the work machine during the imaging, on the basis of a position of the imaging unit calculated by the imaging unit position calculation unit.

According to a second aspect of the present invention, the measurement system according to the aspect 1, further comprises a common portion extraction unit which determines a common portion between a plurality of two-dimensional images captured by the imaging unit during swinging operation of the work machine, wherein the imaging unit position calculation unit calculates a position of the imaging unit when the imaging unit performs imaging.

According to a third aspect of the present invention, in the measurement system according to the aspect 1 or 2, wherein the imaging unit position calculation unit calculates a swing angle of the swing body during imaging to calculate a position of the imaging unit during imaging, and calculates the position of the imaging unit.

According to a fourth aspect of the present invention, in the measurement system according to any one of the aspects 1 to 3, wherein the imaging unit position calculation unit uses a position of the swing body before swinging operation of the swing body or a position of the swing body after swinging operation of the swing body to correct a position of the imaging unit when the imaging unit performs imaging.

According to a fifth aspect of the present invention, in the measurement system according to the aspect 3 or 4, wherein the imaging unit position calculation unit uses a swing angle of the swing body before swinging operation of the swing body and a swing angle of the swing body after swinging operation of the swing body to correct a swing angle of the swing body during swinging operation.

According to a sixth aspect of the present invention, in the measurement system according to any one of the aspects 2 to 5, wherein the imaging unit position calculation unit calculates a position of the imaging unit on the bases of a plurality of common portions by using a least squares method.

According to a seventh aspect of the present invention, in the measurement system according to any one of the aspects 1 to 6, wherein the three-dimensional position calculation unit combines a plurality of three-dimensional positions around the work machine obtained during swinging operation of the swing body.

According to an eighth aspect of the present invention, a work machine comprises the measurement system according to any one of the aspects 1 to 7.

According to a ninth aspect of the present invention, a measurement method comprises: calculating a position of an imaging unit during imaging by the imaging unit attached to a swing body mounted to a work machine during swinging operation of the swing body; and determining a three-dimensional position around the work machine during the imaging, on the basis of the calculated position of the imaging unit.

Advantageous Effects of Invention

According to an aspect of the present invention, the surrounding shape around a work machine can be widely measured.

DESCRIPTION OF EMBODIMENTS

Modes for carrying out the present invention (embodiments) will be described in detail below with reference to the drawings.

<Overall Configuration of Excavator>

Figure 1:
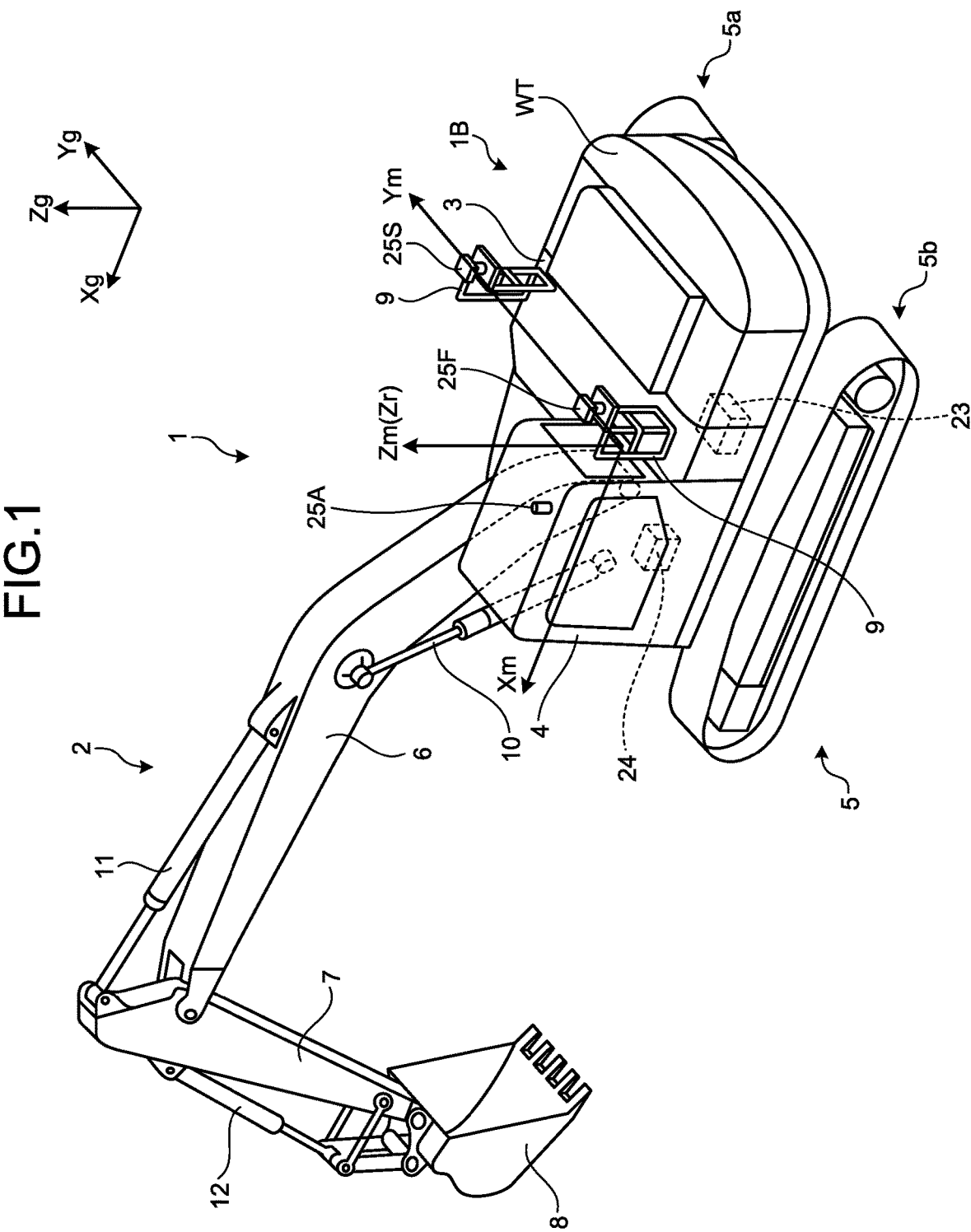
FIG. 1 is a perspective view of an excavator according to an embodiment.
Figure 2:
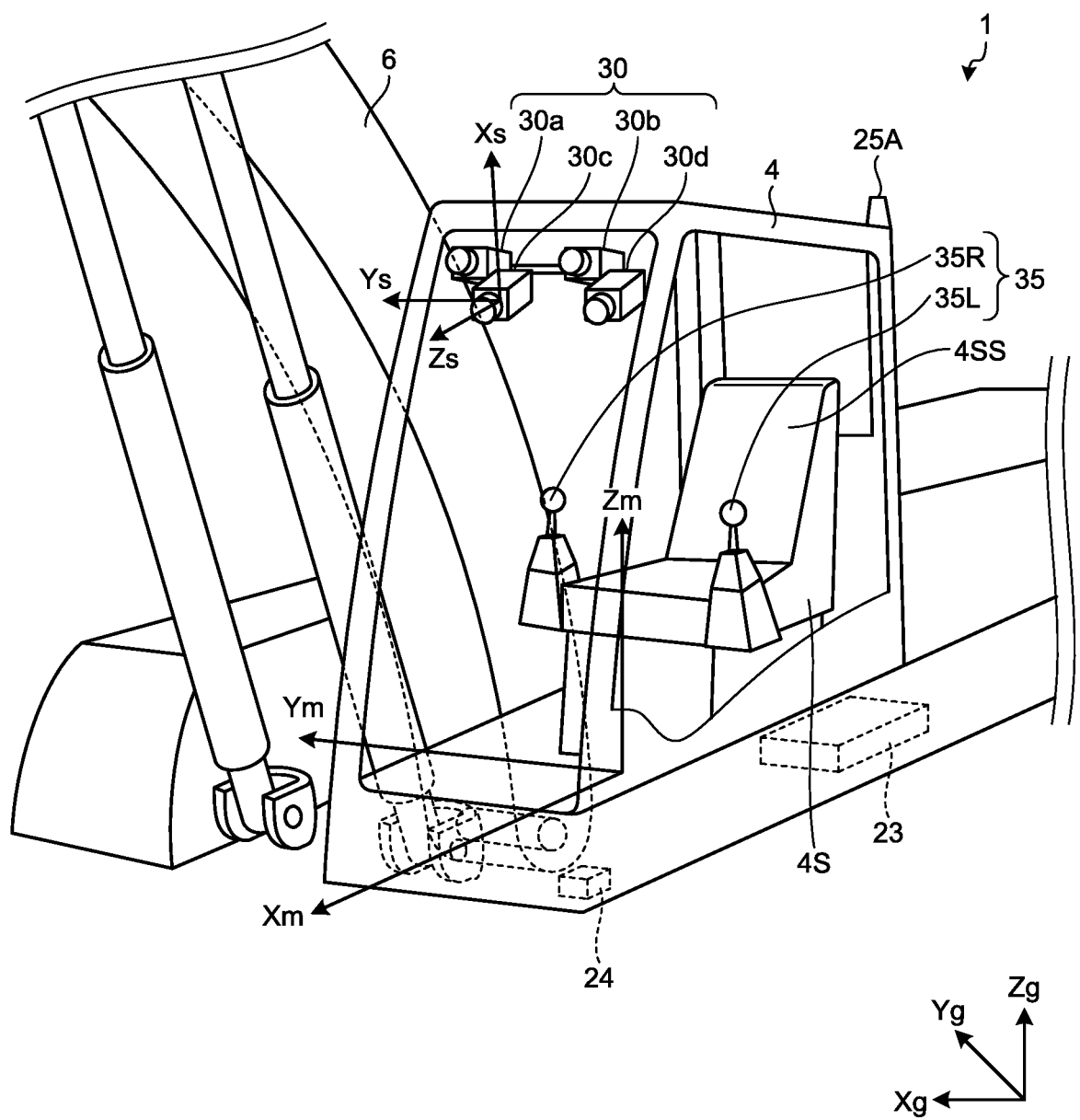
FIG. 2 is a perspective view of a portion around a driver's seat of an excavator according to an embodiment.

FIG. 1 is a perspective view of an excavator 1 according to an embodiment. FIG. 2 is a perspective view of a portion around a driver's seat of the excavator 1 according to an embodiment. The excavator 1 as an example of a work machine includes a vehicle body 1B and working equipment 2. The vehicle body 1B includes a swing body 3, a cab 4, and a travel body 5. The swing body 3 is swingably mounted to the travel body 5 about a swing axis Zr. The swing body 3 houses devices such as a hydraulic pump and an engine.

The working equipment 2 is swingably mounted to the swing body 3. Handrails 9 are mounted on top of the swing body 3. Antennas 25F and 25S are mounted to the respective handrails 9. The antennas 25F and 25S are an antenna for global navigation satellite systems (GNSS). The antennas 25F and 25S are arranged in a direction parallel to a Ym-axis of a vehicle body coordinate system (Xm, Ym, Zm) and are spaced apart from each other by a certain distance. Each of the antennas 25F and 25S receives GNSS radio waves and outputs signals in accordance with the received GNSS radio waves. The antennas 25F and 25S may use an antenna for global positioning system (GPS).

The cab 4 is mounted to a front portion of the swing body 3. The cab 4 has a roof to which an antenna 25A for communication is mounted. The travel body 5 includes tracks 5a and 5b. The tracks 5a and 5b are rotated to travel the excavator 1.

The working equipment 2 is mounted to a front portion of the vehicle body 1B. The working equipment 2 includes a boom 6, an arm 7, a bucket 8 as a working implement, a boom cylinder 10, an arm cylinder 11, and a bucket cylinder 12. In the embodiment, the front side of the vehicle body 1B is positioned in a direction from a backrest 4SS of a driver's seat 4S to an operation device 35 as illustrated in FIG. 2. The rear side of the vehicle body 1B is positioned in a direction from the operation device 35 to the backrest 4SS of the driver's seat 4S. The vehicle body 1B has a front portion which is a portion on the front side of the vehicle body 1B and is positioned on the opposite side to a counterweight WT of the vehicle body 1B. The operation device 35 is a device for operating the working equipment 2 and the swing body 3 and includes a right lever 35R and a left lever 35L.

The swing body 3 includes a position detection device 23 as an example of a position detection unit and an inertial measurement unit (IMU) 24 as an example of an attitude detection unit. The position detection device 23 determines a position of the excavator 1, that is, a position of the swing body 3 in the present embodiment. More specifically, the position detection device 23 uses signals from the antennas 25F and 25S to detect and output the current positions of the antennas 25F and 25S and an orientation of the swing body 3 in a global coordinate system (Xg, Yg, Zg). The orientation of the swing body 3 represents a direction of the swing body 3 in the global coordinate system. For example, the direction of the swing body 3 may be represented by a longitudinal direction of the swing body 3 around a Zg-axis of the global coordinate system. An azimuth angle represents a rotation angle of a reference axis in a longitudinal direction of the swing body 3, around the Zg-axis of the global coordinate system. The azimuth angle represents the orientation of the swing body 3. As described above, an azimuth angle θd of the excavator 1 is determined by the position detection device 23 or the IMU 24, but either may be used.

The IMU 24 determines an attitude of the excavator 1, that is, an attitude of the swing body 3 in the present embodiment. The attitude of the excavator 1 is represented by a roll angle θr, a pitch angle θp, and an azimuth angle θd. The roll angle θr, the pitch angle θp, and the azimuth angle θd of the excavator 1 are obtained from an acceleration and an angular velocity acting on the excavator 1. The IMU 24 detects the acceleration and the angular velocity acting on itself, that is, the acceleration and the angular velocity acting on the excavator 1, and determines and outputs the roll angle θr, the pitch angle θp, and the azimuth angle θd of the excavator 1. In this manner, the IMU 24 determines the attitude of the excavator 1. A calculation device may obtain the roll angle θr, the pitch angle θp, and the azimuth angle θd of the excavator 1 by using the acceleration and the angular velocity detected by the IMU 24. In this configuration, the IMU 24 and the above-described calculation device constitutes an attitude detection device. The roll angle θr, the pitch angle θp, and the azimuth angle θd of the excavator 1 may be obtained by a device other than the IMU 24, for example, a gyroscope.

<Imaging Unit (Device)>

As illustrated in FIG. 2, the excavator 1 includes, as an imaging unit, a plurality of imaging devices 30a, 30b, 30c, and 30d in the cab 4. Hereinafter, when the plurality of imaging devices 30a, 30b, 30c, and 30d are not particularly distinguished from each other, the imaging devices are appropriately referred to as imaging devices 30. The plurality of imaging devices 30 is attached to the swing body 3, images the surrounding shape around the excavator 1, and outputs shape information being information about shape.

The imaging devices 30a and 30c of the plurality of imaging devices 30 are disposed near the working equipment 2. The type of each imaging device 30 is not limited, but in the embodiment, for example, an imaging device including a couple charged device (CCD) image sensor or a complementary metal oxide semiconductor (CMOS) image sensor is employed.

As illustrated in FIG. 2, the imaging device 30a and the imaging device 30b are disposed in the cab 4 at a predetermined interval to be directed in the same direction or in different directions. The imaging device 30c and the imaging device 30d are disposed in the cab 4 at a predetermined interval to be directed in the same direction or in different directions. Two of the plurality of imaging devices 30a, 30b, 30c, and 30d are combined to constitute a stereo camera. In the embodiment, the imaging devices 30a and 30b are combined to constitute a stereo camera, and the imaging devices 30c and 30d are combined to constitute a stereo camera.

In the embodiment, the imaging device 30a and the imaging device 30b are directed upward, and the imaging device 30c and the imaging device 30d are directed downward. At least the imaging device 30a and the imaging device 30c are directed to the front side of the excavator 1, specifically, to the front side of the swing body 3 in the embodiment. The imaging device 30b and the imaging device 30d may be disposed to be directed slightly toward the working equipment 2, that is, slightly toward the imaging device 30a and the imaging device 30c.

In the embodiment, the excavator 1 includes four imaging devices 30, but the number of the imaging devices 30 of the excavator 1 is preferably at least two, that is, at least one pair of imaging devices 30 and is not limited to four. That is because, in the excavator 1, at least one pair of the imaging devices 30 constitutes a stereo camera to capture stereoscopic images of an object to be excavated.

The plurality of imaging devices 30a, 30b, 30c, and 30d is disposed on the front upper side of the cab 4. The upper side is positioned on a side in a direction perpendicular to a ground contact surface of the tracks 5a and 5b of the excavator 1 and away from the ground contact surface. The ground contact surface of the tracks 5a and 5b represents a flat surface defined by at least three non-collinear points in a portion where at least one of the tracks 5a and 5b makes contact with the ground. The lower side is on a side opposite to the upper side, that is, on a side in a direction perpendicular to the ground contact surface of the tracks 5a and 5b and toward the ground contact surface.

The plurality of imaging devices 30a, 30b, 30c, and 30d capture stereoscopic images of the surrounding of the excavator 1, specifically, the object to be excavated positioned in front of the vehicle body 1B. The object to be excavated includes, for example, a portion to be excavated, a portion being excavated, and a portion having been excavated by the excavator 1.

Each of the plurality of imaging devices 30a, 30b, 30c, and 30d detects the object to be excavated, from a predetermined position of the excavator 1, that is, from the front upper side in the cab 4 in the embodiment. In the embodiment, a result obtained from stereoscopic images captured by at least one pair of imaging devices 30 is used to three-dimensionally measure the object to be excavated. Places where the plurality of imaging devices 30a, 30b, 30c, and 30d are disposed are not limited to the front upper side of the cab 4.

For example, the imaging device 30c is selected as a reference, from the plurality of imaging devices 30a, 30b, 30c, and 30d. The plurality of four imaging devices 30a, 30b, 30c, and 30d have coordinate systems. The coordinate systems are appropriately referred to as imaging device coordinate systems. In FIG. 2, only an imaging device coordinate system (Xs, Ys, Zs) of the imaging device 30c, as a reference, is illustrated. The origin of each imaging device coordinate system is at the center of each of the imaging devices 30a, 30b, 30c, and 30d.

In the embodiment, the imaging devices 30a, 30b, 30c, and 30d each have an imaging range larger than an excavation range of the working equipment 2 of the excavator 1. Such a configuration enables the imaging devices 30a, 30b, 30c, and 30d to surely capture stereoscopic images of the object to be excavated within the excavation range of the working equipment 2.

The vehicle body coordinate system (Xm, Ym, Zm) described above is a coordinate system based on the origin fixed to the vehicle body 1B, specifically, the swing body 3 in the embodiment. In the embodiment, the origin of the vehicle body coordinate system (Xm, Ym, Zm) is, for example, at the center of a swing circle of the swing body 3. The center of the swing circle is on the swing axis Zr of the swing body 3. The vehicle body coordinate system (Xm, Ym, Zm) has a Zm-axis being the swing axis Zr of the swing body 3 and an Xm-axis extending in the longitudinal direction of the swing body 3 and orthogonal to the Zm-axis. The Xm-axis is the reference axis in the longitudinal direction of the swing body 3. The Ym-axis is an axis orthogonal to the Zm-axis and Xm-axis and extending in a width direction of the swing body 3. The vehicle body coordinate system is not limited to the example of the embodiment. The global coordinate system (Xg, Yg, Zg) described above is a coordinate system measured by the GNSS and having the origin fixed to the earth.

<Measurement System>

Figure 3:
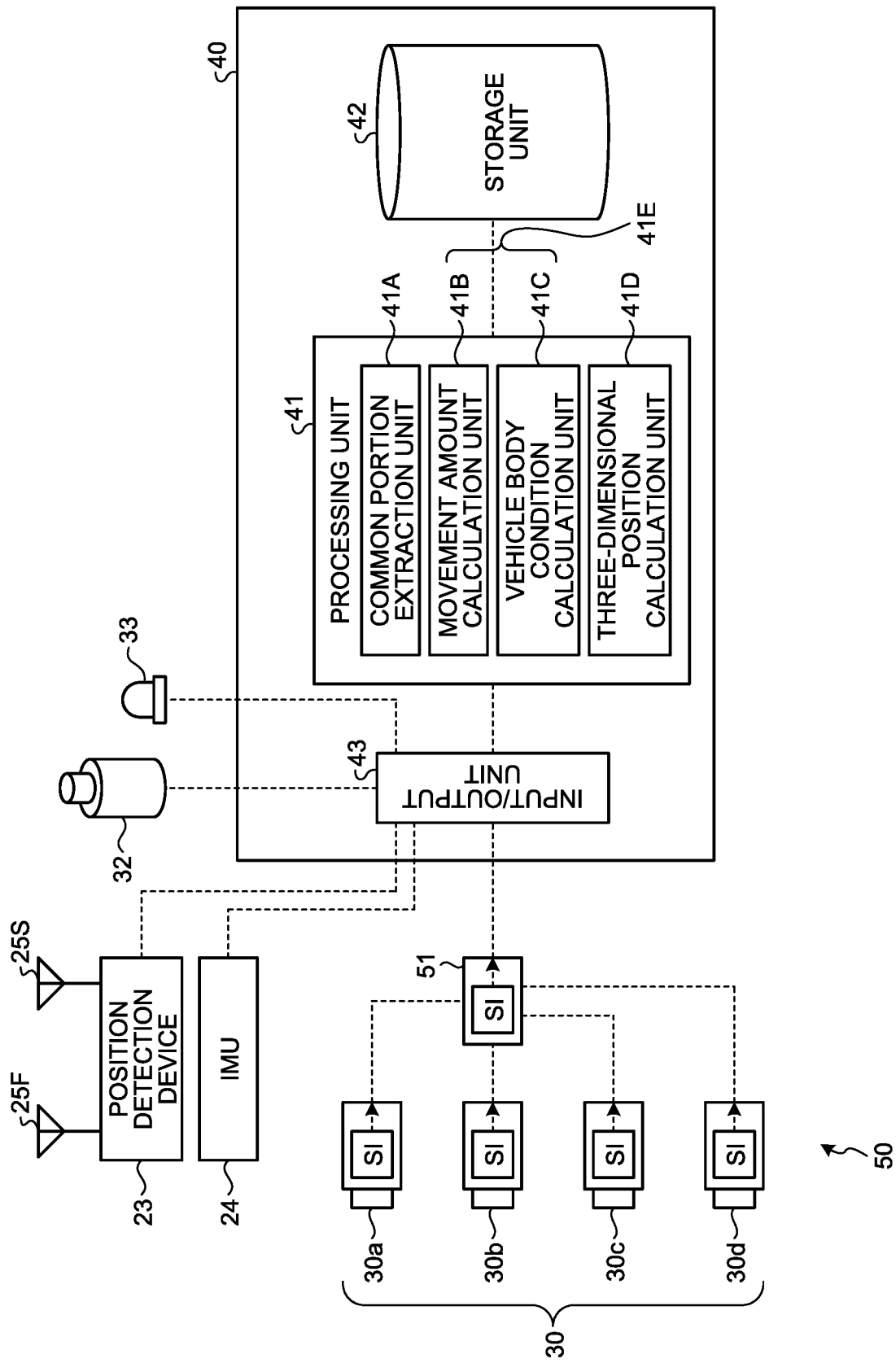
FIG. 3 is a diagram illustrating a measurement system according to an embodiment.

FIG. 3 is a diagram illustrating a measurement system 50 according to an embodiment. A system configuration of the measurement system 50 illustrated in FIG. 3 is merely an example, and the measurement system 50 is not limited to the system configuration of the embodiment. The measurement system 50 is included in the vehicle body 1B of the excavator 1 illustrated in FIG. 1, specifically, the swing body 3 in the embodiment. The measurement system 50 includes the plurality of imaging devices 30a, 30b, 30c, and 30d as a detection device, and a processing device 40. In the embodiment, the measurement system 50 further includes the position detection device 23, the IMU 24, and an input device 32, but the measurement system 50 desirably includes at least the plurality of imaging devices 30a, 30b, 30c, and 30d and the processing device 40.

The processing device 40 includes a processing unit 41, a storage unit 42, and an input/output unit 43. For example, the processing unit 41 is achieved by a combination of a processor, such as a central processing unit (CPU), and a memory. The processing device 40 achieves a measurement method according to an embodiment. In this configuration, the processing unit 41 reads and executes a computer program stored in the storage unit 42. This computer program causes the processing unit 41 to perform the measurement method according to an embodiment.

The processing unit 41 includes a common portion extraction unit 41A, a movement amount calculation unit 41B, a vehicle body condition calculation unit 41C, and a three-dimensional position calculation unit 41D. During operation of the excavator 1, specifically, during swinging operation of the swing body 3 in the present embodiment, when the imaging devices 30 perform imaging a plurality of times, the common portion extraction unit 41A determines a common portion in the plurality of two-dimensional images obtained from the imaging devices 30. The operation of the excavator 1 includes the swinging operation (turning) of the swing body 3 of the excavator 1. During the swinging operation of the swing body 3, the common portion extraction unit 41A determines a common portion from a plurality of two-dimensional images captured by at least one imaging device 30 at different positions in a swinging direction of the swing body 3.

The movement amount calculation unit 41B determines a swing angle of the swing body 3 on the basis of the obtained common portion. The vehicle body condition calculation unit 41C determines a position and an attitude of the excavator 1 during the swinging operation of the swing body 3, on the basis of an obtained swing angle, a position of the excavator 1 determined by the position detection device 23 while the swing body 3 is at rest before swinging, and an attitude of the excavator 1 determined by the IMU 24 while the swing body 3 is at rest before swinging. The three-dimensional position calculation unit 41D determines a three-dimensional position around the excavator 1 by using the obtained position and attitude of the excavator 1 and images captured by at least one pair of imaging devices 30 at a plurality of positions in the swinging direction of the swing body 3. The movement amount calculation unit 41B and the vehicle body condition calculation unit 41C constitute an imaging unit position calculation unit 41E. The imaging unit position calculation unit 41E calculates the positions of the imaging devices 30 during imaging, on the basis of the common portion determined by the common portion extraction unit 41A. During the swinging operation of the swing body 3, to calculate the positions of the imaging devices 30 during imaging, the imaging unit position calculation unit 41E calculates the swing angle of the swing body 3 during imaging and calculates the position of the imaging devices 30.

The storage unit 42 employs at least one of a non-volatile or volatile semiconductor memory, such as a random access memory (RAM), a read only memory (ROM), a flash memory, an erasable programmable read only memory (EPROM), and an electrically erasable programmable read only memory (EEPROM), a magnetic disk, a flexible disk, and a magnetooptical disk.

The storage unit 42 stores a computer program for causing the processing unit 41 to perform the measurement method according to an embodiment. The storage unit 42 stores information used in performance of the measurement method according to an embodiment by the processing unit 41. This information includes, for example, internal calibration data of each imaging device 30, an attitude of each imaging device 30, a positional relationship between the imaging devices 30, a known size of the working equipment 2 or the like, a known size indicating a positional relationship between the origin of the vehicle body coordinate system and each or any of the imaging devices 30, and information required to determine a partial position of the working equipment 2 on the basis of an attitude of the working equipment 2.

The input/output unit 43 is an interface circuit for connecting the processing device 40 and devices. To the input/output unit 43, the position detection device 23, the IMU 24, the input device 32, and a hub 51 are connected. The position detection device 23 and the IMU 24 may be connected to the input/output unit 43 via a communication line. When the communication line is used, an example of a communication standard includes a controller area network (CAN), but the communication standard is not limited thereto.

The plurality of imaging devices 30a, 30b, 30c, and 30d, the input device 32, and a light 33 are connected to the hub 51. The imaging devices 30 and the processing device 40 may be connected to each other without using the hub 51. Shape information SI as results captured by the imaging devices 30a, 30b, 30c, and 30d is input to the input/output unit 43 via the hub 51. The processing unit 41 obtains the results captured by the imaging devices 30a, 30b, 30c, and 30d via the hub 51 and input/output unit 43. The input device 32 is used to input information required to perform the measurement method according to an embodiment by the processing unit 41. The light 33 is turned on when the position detection device 23 and the IMU 24 stably detect and output the position and the attitude of the excavator 1.

Examples of the input device 32 include a switch and a touch panel, but the input device 32 is not limited thereto. In the embodiment, the input device 32 is provided in the cab 4 illustrated in FIG. 2, more specifically in the vicinity of the driver's seat 4S. The input device 32 may be mounted to at least one of the right lever 35R and the left lever 35L of the operation device 35 or may be provided in a monitor panel in the cab 4. Furthermore, the input device 32 may be removable from the input/output unit 43 or may input information to the input/output unit 43 by wireless communication using radio waves or infrared light. The input device 32 may be provided at a mobile terminal device.

The processing device 40 of the measurement system 50 performs stereoscopic image processing on a pair of images of the object to be excavated captured by at least one pair of imaging devices 30 to determine a three-dimensional position of the object to be excavated, specifically, coordinates of the object to be excavated in a three-dimensional coordinate system. As described above, the processing device 40 is configured to use a pair of images obtained by imaging the same object to be excavated by at least one pair of imaging devices 30 to three-dimensionally measure the object to be excavated. That is, at least one pair of imaging devices 30 and the processing device 40 perform three-dimensional stereoscopic measurement of the object to be excavated. The stereoscopic image processing is a procedure to obtain a distance to the object to be excavated on the basis of two images obtained by observing the same object to be excavated by using two different imaging devices 30. The distance to the object to be excavated is represented as, for example, a distance image obtained by visualizing distance information to the object to be excavated by shading. The distance image is information representing a three-dimensional shape or a three-dimensional position of the object to be excavated. Each pixel included in the distance image has information on a three-dimensional position of the object to be excavated.

In the embodiment, the three-dimensional position calculation unit 41D of the processing unit 41 included in the processing device 40 executes stereoscopic image processing. The processing device 40 acquires the shape information SI of the object to be excavated which is detected, that is, imaged by at least one pair of imaging devices 30, and determines a three-dimensional position of the object to be excavated on the basis of the acquired shape information SI. The shape information SI is an image of the object to be excavated captured by the at least one pair of imaging devices 30. The processing device 40 determines the three-dimensional position of the object to be excavated by performing the stereoscopic image processing on the image of the object to be executed, and outputs the three-dimensional position. As described above, the processing device 40 uses a pair of images obtained by imaging the same object to be excavated by at least one pair of imaging devices 30 to three-dimensionally measure the object to be excavated. As described above, at least one pair of imaging devices 30 and the processing device 40 perform three-dimensional stereoscopic measurement of the object to be excavated, specifically, the surrounding of the excavator 1 in the embodiment.

When stereoscopic image processing is performed, the distance image is obtained. A three-dimensional position of the object to be excavated in each pixel of the distance image represents a three-dimensional position in the imaging device coordinate system. A position around the excavator 1 three-dimensionally measured by the measurement system 50 is a three-dimensional position in the global coordinate system. Therefore, the measurement system 50, specifically, the processing device 40, transforms a three-dimensional position obtained by executing the stereoscopic image processing, from the position in the imaging device coordinate system to a position in the global coordinate system. This transformation is performed by the three-dimensional position calculation unit 41D of the processing unit 41.

The three-dimensional position calculation unit 41D acquires the position of the excavator 1 in the global coordinate system determined by the position detection device 23 and the attitude of the excavator 1 determined by the IMU 24. The position of the excavator 1 is represented by at least one of the positions of the antennas 25F and 25S. The attitude of the excavator 1 is represented by the roll angle θr, the pitch angle θp, and the azimuth angle θd. The three-dimensional position calculation unit 41D uses the position and the attitude of the excavator 1 to transform a three-dimensional position included in a distance image obtained from the shape information SI detected by at least one pair of imaging devices 30, from the imaging device coordinate system to the global coordinate system, and outputs the three-dimensional position.

<Continuous Three-Dimensional Measurement>

Figure 4:
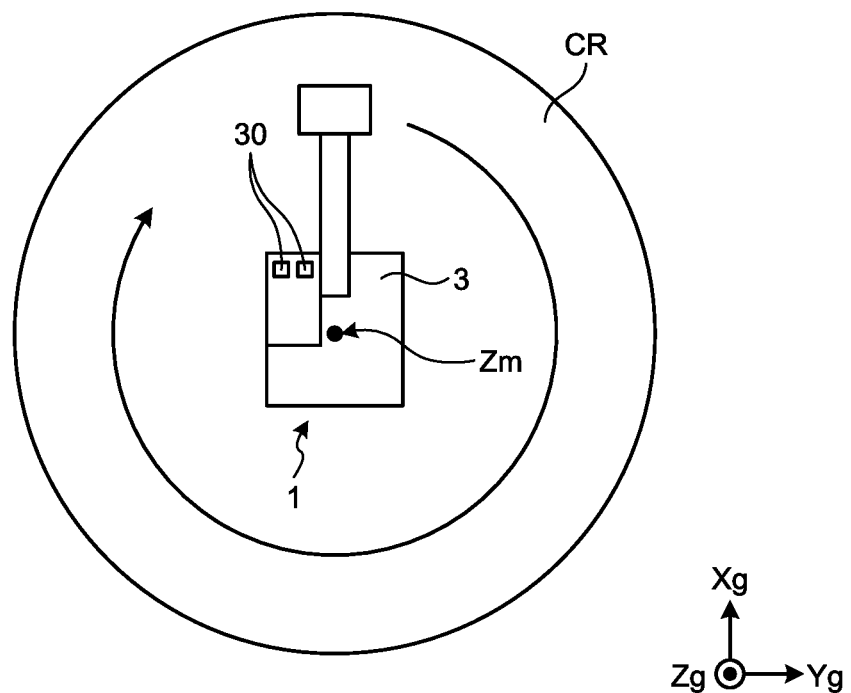
FIG. 4 is a plan view of an example of continuous measurement of the surrounding of an excavator.

FIG. 4 is a plan view of an example of continuous measurement of the surrounding of the excavator 1. Since the imaging device 30 of the measurement system 50 is attached to the swing body 3 of the excavator 1, at least one pair of imaging devices 30 images the surrounding CR of the excavator 1 during swinging operation of the swing body 3, and It is possible to measure the entire three-dimensional positions of the surrounding CR of the excavator 1. The processing device 40 of the measurement system 50 transforms a three-dimensional position in the imaging device coordinate system obtained by executing stereoscopic image processing to a three-dimensional position in the global coordinate system. In this coordinate transformation, information on the position detection device 23 and the IMU 24 is required.

The position detection device 23 outputs a position at predetermined periodic intervals. Therefore, when, on the basis of information obtained from the position detection device 23, the processing device 40 determines a three-dimensional position of the surrounding CR during the swinging operation of the swing body 3, a difference between timing at which an imaging device 30 performs imaging and timing at which the position detection device 23 acquires the position and orientation of the excavator 1 causes a reduction in accuracy of the position and orientation of the excavator 1. As a result, the accuracy of the three-dimensional position may be reduced. In addition, the IMU 24 may have accuracy decreasing in attitude and acceleration detection while the IMU 24 is moving. When, on the basis of information obtained from the IMU 24 as described above, the processing device 40 determines a three-dimensional position of the surrounding CR during the swinging operation of the swing body 3, the accuracy in the attitude and acceleration of the excavator 1 detected by the IMU 24 decreases, and the accuracy of the three-dimensional position may be lowered.

To measure the surrounding CR of the excavator 1 while swinging the swing body 3, a method can be considered that an imaging device 30 performs imaging after the position detection device 23 and the IMU 24 are brought into a state to stably detect the position and the attitude of the excavator 1. In this case, the swing body 3 swings intermittently. In addition, the imaging device 30 needs to suspend imaging until the position detection device 23 and the IMU 24 stably detect the position and the attitude of the excavator 1. Therefore, the method, in which imaging is suspended until the position detection device 23 and the IMU 24 become stable, requires a long time to perform the measurement.

In the embodiment, the measurement system 50 detects the shape information SI about the surrounding CR of the excavator 1 during continuous swinging operation of the swing body 3 of the excavator 1 instead of the intermittent swinging thereof, and determines a three-dimensional position of the surrounding CR of the excavator 1 on the basis of the detected shape information SI. Such processing enables the measurement system 50 to shorten the time required to detect the shape information SI about the surrounding CR of the excavator 1.

Figure 5:
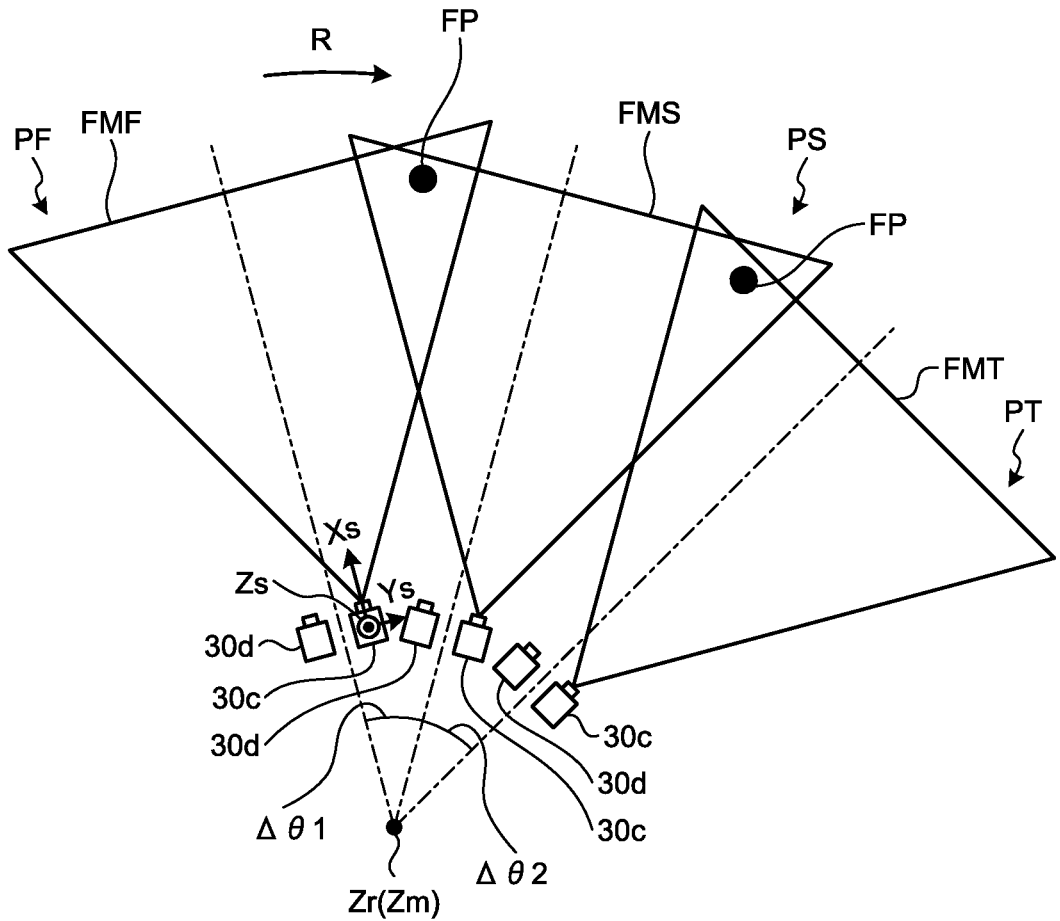
FIG. 5 is a diagram illustrating three-dimensional measurement of the surrounding of an excavator during swinging operation of a swing body by a measurement system according to an embodiment.
Figure 6:
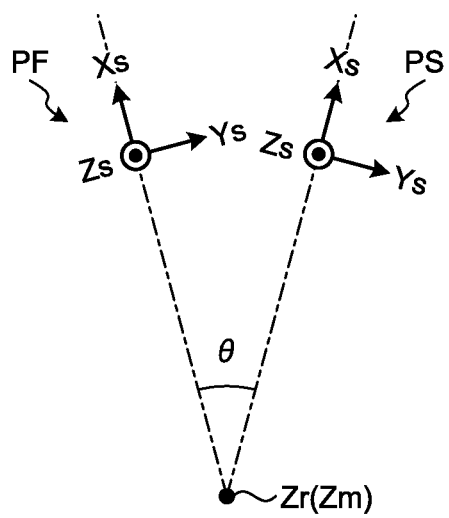
FIG. 6 is a diagram illustrating a movement of an imaging device coordinate system as a result of swinging operation of a swing body.
Figure 7:
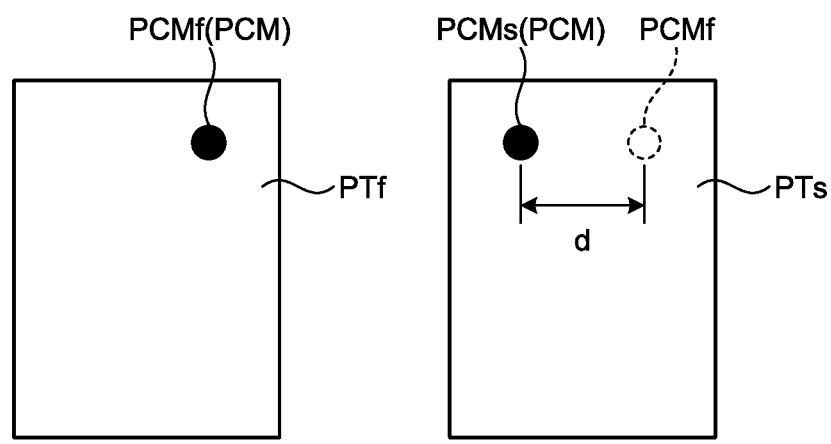
FIG. 7 is a diagram illustrating an example of images captured during swinging operation of a swing body.

FIG. 5 is a diagram illustrating three-dimensional measurement of the surrounding CR of the excavator 1 during swinging operation of the swing body 3 by the measurement system 50 according to an embodiment. FIG. 6 is a diagram illustrating a movement of the imaging device coordinate system (Xs, Ys, Zs) as a result of swinging operation of the swing body 3. FIG. 7 is a diagram illustrating an example of images PTf and PTs captured during swinging operation of the swing body 3.

In the embodiment, while the position detection device 23 and the IMU 24 stably detect and output the position and the attitude of the excavator 1, respectively, the measurement system 50 obtains the position of the excavator 1 from the position detection device 23 and the attitude of the excavator 1 from the IMU 24. Specifically, while the swing body 3 is at rest before swinging, the measurement system 50 acquires the position of the excavator 1 from the position detection device 23 and the attitude of the excavator 1 from the IMU 24. In this configuration, the swing body 3 is in a rest state and also the excavator 1 is not in a traveling state. This is because the position detection device 23 and the IMU 24 stably detect and output the position and the attitude of the excavator 1, respectively. For example, after a predetermined time has passed after the swing body 3 is stopped, the processing unit 41 determines that the position detection device 23 and the IMU 24 are in a state to stably detect and output a position and an attitude of the excavator 1, respectively.

When, after the swing body 3 rests while being directed to the object to be excavated which is measured, the processing device 40 of the measurement system 50, specifically, the processing unit 41 determines that the position detection device 23 and the IMU 24 are in a state to stably detect and output the position and the attitude of the excavator 1, respectively, and notifies of, for example, the state of the position detection device 23 and the IMU 24. In the embodiment, the processing unit 41 turns on the light 33 illustrated in FIG. 3 to perform the above-described notification.

When receiving an imaging start instruction for an imaging device 30 from the input device 32 after turning on the light 33, the processing unit 41 acquires the position and the attitude of the excavator 1 from the position detection device 23 and the IMU 24, respectively. The storage unit 42 temporarily stores the position and the attitude of the excavator 1 acquired before swinging operation of the swing body 3. When acquiring the position and the attitude of the excavator 1, the processing unit 41 starts imaging by the imaging devices 30a, 30b, 30c, and 30d and swings the swing body 3. The swing body 3 may be swung according to operation by an operator of the excavator 1.

Each of the imaging devices 30a, 30b, 30c, and 30d performs imaging a plurality of times at predetermined periodic intervals during the swinging operation of the swing body 3, and a plurality of images of the surrounding CR of the excavator 1 are obtained at a plurality of positions in a swinging direction of the swing body 3 (for example in a direction indicated by an arrow R in FIG. 5). The storage unit 42 temporarily stores the obtained images. When the swing body 3 swings through a predetermined angle, for example, through 360 degrees, the processing unit 41 stops the swing body 3. At this time, the excavator 1 is stopped. When the position detection device 23 and the IMU 24 respectively detect and output a position and an attitude of the excavator 1 stably after the swing body 3 stops, the processing unit 41 acquires the position and the attitude of the excavator 1 from the position detection device 23 and the IMU 24, respectively. The storage unit 42 temporarily stores the position and the attitude of the excavator 1 acquired after the position detection device 23 and the IMU 24 are brought into a state to stably output the position and the attitude of the excavator 1 after the swinging operation of the swing body 3. The imaging devices 30*a*, 30*b*, 30*c*, and 30*d* image the object to be excavated, after the position detection device 23 and the IMU 24 are brought into a state to stably output the position and the attitude of the excavator 1 after the swinging operation of the swing body 3.

When the swing body 3 is swung according to the operation by the operator of the excavator 1, each of the imaging devices 30*a*, 30*b*, 30*c*, and 30*d* may perform imaging a plurality of times at predetermined periodic intervals after receiving the imaging start instruction from the input device 32. Furthermore, each of the imaging devices 30*a*, 30*b*, 30*c*, and 30*d* may be configured to perform imaging a plurality of times at predetermined periodic intervals when the position detection device 23 or the IMU 24 detects that the swing body 3 starts to swing. When the swing of the swing body 3 is stopped according to the operation by the operator of the excavator 1, after the position detection device 23 and the IMU 24 respectively detect and output the position and the attitude of the excavator 1 stably, each of the imaging devices 30*a*, 30*b*, 30*c*, and 30*d* may stop the imaging which is performed at predetermined periodic intervals. When the imaging devices 30*a*, 30*b*, 30*c*, and 30*d* perform imaging a plurality of times, at least one of the first imaging and the last imaging is performed while the swing body 3 is at rest. Imaging performed by each of the imaging devices 30*a*, 30*b*, 30*c*, and 30*d* during the operation of the excavator 1 includes at least one imaging performed while the excavator 1 is at rest.

In order to determine a three-dimensional position of the surrounding CR of the excavator 1, the processing unit 41 determines a position and an attitude of the excavator 1 during swinging of the swing body 3 on the basis of the position and the attitude of the excavator 1 obtained while the swing body 3 and the excavator 1 are at rest before swinging of the swing body 3, and a swing angle θ of the swing body 3. The processing unit 41, therefor, determines the swing angle θ of the swing body 3.

As illustrated in FIG. 7, the common portion extraction unit 41A of the processing unit 41 extracts a common portion PCM from the image PTf captured by, for example, the imaging device 30*c* at a first position during the swinging operation of the swing body 3, and the image PTs captured by the imaging device 30*c* at a second position during swinging operation of the swing body 3. From the first position PF to the second position PS, the imaging devices 30*c* and 30*d* turn by a swing angle Δθ about the swing axis Zr of the swing body 3, in other words, the Zm-axis of the vehicle body coordinate system in the embodiment.

The common portion PCM is determined from the plurality of images PTf and PTs captured by at least one of the plurality of imaging devices 30 at different positions in the swinging direction of the swing body 3. The image PTf corresponds to a first range FMF imaged by the imaging device 30*c*, at the first position PF illustrated in FIG. 5. The image PTs corresponds to a second range FMS imaged by the imaging device 30*c* at the second position PS illustrated in FIG. 5.

A portion where the first range FMF and the second range FMS overlap each other has a feature portion FP. The feature portion FP is partially PCMf in the image PTf and partially PCMs in the image PTs. The portions PCMf and PCMs are the common portion PCM of the image PTf and the image PTs. For extraction of the common feature portion FP between the image PTf and the image PTs by the common portion extraction unit 41A, a method is exemplified in which the common portion extraction unit 41A extracts the feature portions FP from the image PTf and the image PTs at first and finds a similar feature portion in the feature portions FP. The common portion extraction unit 41A acquires the image PTf and the image PTs from the storage unit 42 and extracts the common portion PCM. The common portion extraction unit 41A extracts the common portion PCM from the image PTf and the image PTs by using an algorithm for detecting a feature point between a plurality of images, such as a Harris operator. The common portion extraction unit 41A may extract the common portion PCM from the image PTf and the image PTs by using an algorithm other than the Harris operator.

When the common portion PCM is extracted, the movement amount calculation unit 41B of the processing unit 41 determines the swing angle Δθ on the basis of the common portion PCM. When the image PTf and the image PTs share the common portion PCM, the position of the common portion PCM changes between the image PTf and the image PTs. The amount d of this change corresponds to the swing angle Δθ.

When the swing body 3 swings about the swing axis Zr by the swing angle Δθ, the imaging device coordinate system (Xs, Ys, Zs) moves about the swing axis Zr of the swing body 3 from the first position PF to the second position PS by the swing angle θ, as illustrated in FIG. 6. Since the swing body 3 swings about the swing axis Zr, in other words, the Zr-axis of the vehicle body coordinate system in the embodiment, the angle through which the imaging device coordinate system (Xs, Ys, Zs) is rotated about the Zs-axis, between the first position PF and the second position PS represents the swing angle θ. As illustrated in FIG. 6, a one-dot chain line extending from the swing axis Zr toward the imaging devices 30*c* and 30*d* and an Xs-axis of the imaging device coordinate system (Xs, Ys, Zs) do not necessarily coincide with each other.

In this case, the swing angle Δθ is determined by at least one of, for example, an eight-point algorithm, a three dimension to three dimension (3D-3D) transformation, and bundle adjustment. The swing angle Δθ is determined under the condition that the swing body 3 swings about the swing axis Zr by the swing angle θ, that is, under the condition that the swing body 3 is constrained at the center of the swing thereof. Therefore, for example, when the eight-point algorithm is used, one common portion PCM between the image PTf and the image PTs enables to solve the swing angle Δθ by using the eight-point algorithm method.

The movement amount calculation unit 41B of the processing unit 41 determines the swing angle Δθ on the basis of the eight-point algorithm or the like, by using the common portion PCM between the image PTf and the image PTs. Over the entire period from the start to the end of swinging of the swing body 3, the swing angle θ is determined for each pair of images between which the common portion PCM is obtained.

The common portion PCM in an image captured before the swinging operation moves on an image captured after the swinging operation according to the magnitude of the swing angle Δθ. Therefore, to determine the swing angle Δθ on the basis of the eight-point algorithm, the movement of the common portion PCM is used. Actually, the destination of the common portion PCM varies also depending on a three-dimensional position of the common portion PCM. Even when the common portion PCM has an unknown three-dimensional position, when an image has the common portion PCM at least at one point, a variable is limited only to the swing angle θ, regardless of the three-dimensional position of the common portion PCM, and the swing angle Δθ can be determined. In this way, the swing angle Δθ can be determined with only one point, but since there is a possibility that the swing angle Δθ may have a large error, the swing angle θ is accurately calculated on the basis of the common portions PCM at a plurality of points by using a least squares method. When the swing angle Δθ is determined on the basis of the eight-point algorithm, it is unnecessary to measure the object to be excavated by a stereo camera before and after swinging. When, instead of limiting the variable to only the swing angle Δθ, a total of six variables, specifically, an Xs-direction variable, the Ys-direction variable, and the Zs-direction variable at the position of an imaging device 30, and further three variables representing an attitude of the imaging device, specifically, variables representing the rotation directions about the Xs-axis, the Ys-axis, and the Zs-axis are determined by using the eight-point algorithm method, the common portions PCM at least at eight points are required in images acquired before and after swinging.

The three-dimensional position (calculated on the basis of measurement by a stereo camera) of the common portion PCM in an image captured before swinging operation changes after the swinging operation, according to the magnitude of the swing angle Δθ, when viewed from an imaging device 30. Therefore, the change in the three-dimensional position of the common portion PCM is used to determine the swing angle Δθ on the basis of the 3D-3D transformation. For example, when the common portion PCM at a position (1,0,0) in the vehicle body coordinate system measured by the stereo camera before swinging operation is changed to a position (0, 1, 0) in the vehicle body coordinate system measured by the stereo camera after the swinging operation, it can be said that the swing body 3 swings 90 degrees about the Zm-axis of the vehicle body coordinate system. In this way, the swing angle Δθ can be determined with only one point, but since there is a possibility that the swing angle Δθ may have a large error, the swing angle θ is accurately calculated on the basis of the common portions PCM at a plurality of points by using the least squares method. When the swing angle Δθ is determined on the basis of the 3D-3D transformation, it is necessary to measure the object to be excavated by a stereo camera before and after swinging. When, instead of limiting the variable to only the swing angle Δθ, a total of six variables, specifically, an Xs-direction variable, the Ys-direction variable, and the Zs-direction variable at the position of an imaging device 30, and further three variables representing the attitude of the imaging device, specifically, variables representing the rotation directions about the Xs-axis, the Ys-axis, and the Zs-axis are determined by using the 3D-3D transformation, the common portions PCM at least at three points are required in images acquired before and after swinging.

The three-dimensional position (calculated on the basis of measurement by a stereo camera) of the common portion PCM in an image captured before swinging is located at a position on an image captured after the swinging, according to the magnitude of the swing angle θ, or the three-dimensional position of the common portion PCM in the image captured before swinging changes after swinging, according to the magnitude of the swing angle Δθ, when viewed from an imaging device 30. Therefore, the three-dimensional position of the common portion PCM is used to determine the swing angle θ on the basis of the bundle adjustment. Furthermore, in the bundle adjustment, when an image has the common portion PCM at least at one point, where the variable is limited only to the swing angle Δθ, the swing angle Δθ can be determined. In this way, the swing angle Δθ can be determined with only one point, but since there is a possibility that the swing angle Δθ may have a large error, the swing angle θ is accurately calculated on the basis of the common portions PCM at a plurality of points by using the least squares method.

When the swing angle Δθ is determined on the basis of the bundle adjustment, it is necessary to measure the object to be excavated by a stereo camera before swinging or measure the object to be excavated by the stereo camera after swinging. When, instead of limiting the variable to only the swing angle Δθ, a total of six variables, specifically, an Xs-direction variable, the Ys-direction variable, and the Zs-direction variable at the position of an imaging device 30, and further three variables representing the attitude of the imaging device, specifically, variables representing the rotation directions about the Xs-axis, the Ys-axis, and the Zs-axis are determined by using the bundle adjustment, the common portions PCM at least at six points are required in images acquired before and after swinging.

When the swing angle Δθ is obtained, the vehicle body condition calculation unit 41C of the processing unit 41 determines the position and the attitude of the excavator 1 during the swinging operation, on the basis of the obtained swing angle Δθ, the position of the excavator 1 determined by the position detection device 23 while the swing body 3 is at rest before swinging, and the attitude of the excavator 1 determined by the IMU 24 while the swing body 3 is at rest before swinging. When the swing body 3 swings by the swing angle Δθ after the rest state, on condition that the swinging by the swing angle θ about the swing axis Zr (Zm-axis in the embodiment) in an Xm-Ym plane of the vehicle body coordinate system (Xm, Ym, Zm), the vehicle body condition calculation unit 41C calculates a position and an attitude of the excavator 1 in the rest state before the swinging operation by the swing angle Δθ, on the basis of a position and an attitude of the excavator 1 in a rest state before the swinging operation.

In the example illustrated in FIG. 5, it is assumed that imaging is performed by an imaging device 30, at the first position PF (at rest before swinging operation), the second position PS (during the swinging operation), and a third position PT (during the swinging operation). When a position and an attitude of the excavator 1 can be measured at the first position PF (at rest) and a swing angle Δθ1 from the first position PF to the second position PS is determined on the basis of a feature point, a position and an attitude of the excavator 1 at the second position PS (during swinging operation) can be found. Then, when a swing angle Δθ2 from the second position PS to the third position PT can be determined on the basis of the feature point, a position and an attitude of the excavator 1 at the third position PT (during the swinging operation) can be found. In this manner, the position and the attitude of the excavator 1 at a position at which imaging is performed by an imaging device 30 during the swinging operation are found step by step.

For example, the vehicle body condition calculation unit 41C performs rotational transformation of the position and the attitude of the excavator 1 in the rest state before the swinging operation by the swing angle Δθ about the Zm-axis of the vehicle body coordinate system (Xm, Ym, Zm), and determines a position and an attitude of the excavator 1 during the swinging operation or after the swinging operation. The position and the attitude of the excavator 1 during the swinging operation or after the swinging operation can be changed, for example, to the position and the attitude of the excavator 1 in the vehicle body coordinate system (Xm, Ym, Zm) during the rest state before the swinging operation. In the embodiment, the position and the attitude of the excavator 1 during the swinging operation or after the swinging operation are defined as, but are not limited to, the position and the attitude of the imaging device 30 during the swinging operation or after the swinging operation in the vehicle body coordinate system (Xm, Ym, Zm) before the swinging operation.

The above-mentioned swing angle Δθ represents a swing angle difference between each position and an immediately previous position of the swing body 3. Hereinafter, the swing angle difference is defined as Δθ, and an angle obtained by integrating Δθ is defined as the swing angle θ. A position and an attitude of the excavator 1 during the swinging operation, that is, positions and attitudes of the excavator 1 during a period from the start to the end of the swinging, at different positions in the swinging direction of the swing body 3 are determined on the basis of the position and the attitude of the excavator 1 in the rest state before the swinging operation by using the swing angle θ at each circumferential position of the swing body 3. A position and an attitude of the excavator 1 after the swinging operation is determined on the basis of the position and the attitude of the excavator 1 in the rest state before the swinging operation by using the swing angle θ at a circumferential position of the swing body 3 after the swinging operation. The swing angle θ at each circumferential position of the swing body 3 is based on a swing angle in the rest state before the swinging operation. The swing angle θ at each circumferential position of the swing body 3 is based on the swing angle in the rest state before the swinging operation.

A position of an imaging device 30 before the swinging operation is Ps1 (Xs1, Ys1, Zs1), and a position of the imaging device 30 during the swinging operation or after the swinging operation is Ps2 (Xs2, Ys2, Zs2). Both the position Ps1 and the position Ps2 are positions in the imaging device coordinate system. The position Ps1 and the position Ps2 are transformed to a position Pm1 (Xm1, Ym1, Zm1) and a position Pm2 (Xm2, Ym2, Zm2) in the vehicle body coordinate system, respectively. The position Ps1 is transformed to the position Pm1 according to Formula (1) and the position Ps2 is transformed to the position Pm2 according to Formula (2). The three-dimensional position calculation unit 41D of the processing unit 41 uses Formula (2) to transform the position Ps2 of the imaging device 30 during the swinging operation, which is a position of the excavator 1 during the swinging operation, to the position Pm2 in the vehicle body coordinate system (Xm, Ym, Zm) during the rest state before the swinging operation. As in the transformation of the position Ps2 of the imaging device 30 during the swinging operation, the attitude of the imaging device 30 during the swinging operation which is an attitude of the excavator 1 during the swinging operation is also transformed to an attitude in the vehicle body coordinate system (Xm, Ym, Zm) during the rest state before the swinging operation by using Formula (2).

$$\begin{pmatrix} Xm1 \\ Ym1 \\ Zm1 \end{pmatrix} = \begin{pmatrix} \cos\gamma & -\sin\gamma & 0 \\ \sin\gamma & \cos\gamma & 0 \\ 0 & 0 & 1 \end{pmatrix} \quad (1)$$

$$\begin{pmatrix} \cos\beta & 0 & \sin\beta \\ 0 & 1 & 0 \\ -\sin\beta & 0 & \cos\beta \end{pmatrix} \begin{pmatrix} 1 & 0 & 0 \\ 0 & \cos\alpha & -\sin\alpha \\ 0 & \sin\alpha & \cos\alpha \end{pmatrix} \times \begin{pmatrix} Xs1 \\ Ys1 \\ Zs1 \end{pmatrix} + \begin{pmatrix} Xt \\ Yt \\ Zt \end{pmatrix}$$

$$\begin{pmatrix} Xm2 \\ Ym2 \\ Zm2 \end{pmatrix} = \begin{pmatrix} \cos(\gamma+\theta) & -\sin(\gamma+\theta) & 0 \\ \sin(\gamma+\theta) & \cos(\gamma+\theta) & 0 \\ 0 & 0 & 1 \end{pmatrix} \begin{pmatrix} \cos\beta & 0 & \sin\beta \\ 0 & 1 & 0 \\ -\sin\beta & 0 & \cos\beta \end{pmatrix} \quad (2)$$

$$\begin{pmatrix} 1 & 0 & 0 \\ 0 & \cos\alpha & -\sin\alpha \\ 0 & \sin\alpha & \cos\alpha \end{pmatrix} \times \begin{pmatrix} Xs2 \\ Ys2 \\ Zs2 \end{pmatrix} + \begin{pmatrix} Xt + R \times \cos\theta \\ Yt + R \times \sin\theta \\ Zt \end{pmatrix}$$

$$R = \sqrt{(Xt^2 + Yt^2)} \quad (3)$$

R in Formula (2) is represented by Formula (3). In Formulas (1) and (2), α is a rotation angle about the Xs-axis of the imaging device coordinate system, β is a rotation angle about the Ys-axis of the imaging device coordinate system, and γ is a rotational angle displacement about the Zs-axis of the imaging device coordinate system. Xt, Yt, and Zt are displacements between the imaging device coordinate system (Xs, Ys, Zs) and the vehicle body coordinate system (Xm, Ym, Zm), and the displacements are represented in the directions of the Xm-axis, the Ym-axis, and the Zm-axis of the vehicle body coordinate system (Xm, Ym, Zm), respectively.

When the position and the attitude of the excavator 1 during the swinging operation are obtained, the three-dimensional position calculation unit 41D determines a three-dimensional positions of the surrounding CR of the excavator 1 by using the position and the attitude of the excavator 1 during the swinging operation and results captured by at least one pair of imaging devices 30 at a plurality of positions in the swinging direction of the swing body 3. For example, the position and the attitude of the excavator 1 in the global coordinate system are obtained at a position where the swing body 3 is turned from the rest state by the swing angle θ. Therefore, the three-dimensional position calculation unit 41D can transform a three-dimensional position included in a pixel in a distance image, from the imaging device coordinate system to the global coordinate system, by using the obtained position and attitude. In this way, the three-dimensional position calculation unit 41D can determine the three-dimensional position of the surrounding CR of the excavator 1 in the global coordinate system.

The three-dimensional position calculation unit 41D may determine the three-dimensional position of the surrounding CR of the excavator 1 without using the position and the attitude of the excavator 1 during the swinging operation. In this case, in Formulas (1) and (2), a position of the object to be excavated imaged by the imaging device 30 before the swinging operation is Ps1 (Xs1, Ys1, Zs1), and a position of the object to be excavated imaged by the imaging device 30 during or after the swinging operation is Ps2 (Xs2, Ys2, Zs2). The three-dimensional position calculation unit 41D uses Formula (2) to transform the position Ps2 of the object to be excavated in the imaging device coordinate system (Xs, Ys, Zs), imaged by the imaging device 30 during the swinging operation, to the position Pm2 in the vehicle body coordinate system (Xm, Ym, Zm) during the rest state before the swinging operation. In this way, the three-dimensional position calculation unit 41D can determine a three-dimensional position included in a pixel in the distance image obtained during or after the swinging operation, by using the swing angle θ. The three-dimensional position calculation unit 41D uses the position and the attitude of the excavator 1 in the rest state before the swinging operation to transform the position Pm2 in the vehicle body coordinate system (Xm, Ym, Zm) during the rest state before the swinging operation to a position in the global coordinate system.

In this manner, the three-dimensional position calculation unit 41D determines a three-dimensional position of the surrounding CR of the excavator 1 by using a swing angle θ, a position of the excavator 1 determined by the position detection device 23 while the swing body 3 is at rest before swinging, and an attitude of the excavator 1 determined by the IMU 24 while the swing body 3 is at rest before swinging, and results captured by at least one pair of imaging devices 30 at a plurality of positions in a swinging direction of the swing body 3.

Figure 8:
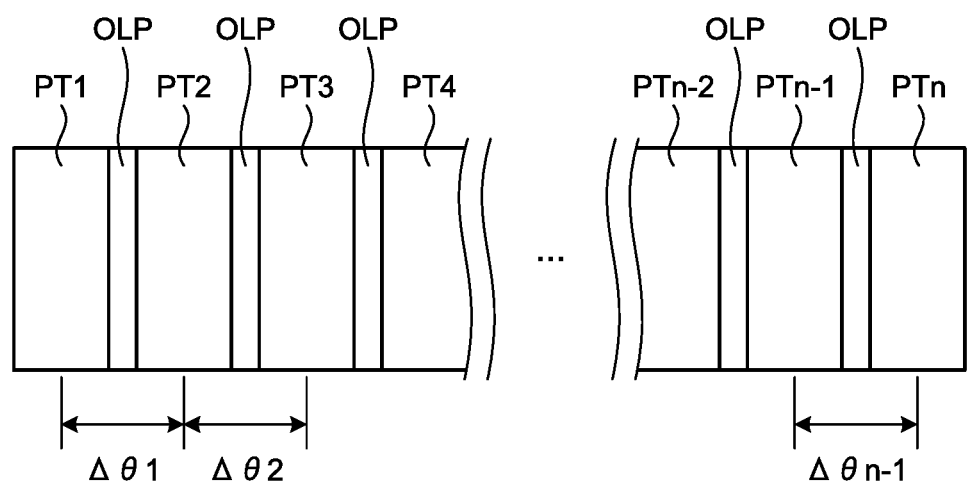
FIG. 8 is a diagram illustrating combining a plurality of images captured during swinging operation of a swing body and having a three-dimensional position determined.

FIG. 8 is a diagram illustrating combining a plurality of images PT1 to PTn captured during the swinging operation of the swing body and having a three-dimensional position determined. The three-dimensional position calculation unit 41D combines three-dimensional positions at the respective positions in a swing direction of the swing body 3, which are captured by at least one pair of imaging devices 30 and determined by the above-described processing. The images PT1 to PTn (n is an integer equal to or larger than 3) illustrated in FIG. 8 are distance images obtained by transforming to three-dimensional positions in the global coordinate system by the three-dimensional position calculation unit 41D. When the distance images PT1 to PTn are not particularly distinguished from each other, the distance images PT1 to PTn are referred to as distance images PT. The distance image PT1 is obtained during the rest state before swinging, and the distance image PTn is obtained during the rest state after the swinging.

In the embodiment, a plurality of distance images PT1, PT2, PT3, PT4, . . . PTn-2, PTn-1, and PTn are combined, but the distance images have overlapping portions OLT therebetween. This configuration inhibits the omission of measurement in the swinging direction of the swing body 3 when the surrounding CR of the excavator 1 is measured.

Swing angles $\Delta\theta 1, \Delta\theta 2, \ldots$, and $\Delta\theta n-1$ between adjacent distance images PT are set to have a magnitude large enough to have an overlapping portion OLP between adjacent distance images PT, on the basis of an imaging range of an imaging device 30. The swing angles $\Delta\theta 1, \Delta\theta 2, \ldots$, and $\Delta\theta n-1$ may differ depending on the circumferential position of the swing body 3 or may have the same value. The three-dimensional position calculation unit 41D acquires a distance image PTD at each of the set swing angles $\Delta\theta 1, \Delta\theta 2, \ldots$, and $\Delta\theta n-1$ and combines the distance images PTD to generate information representing a three-dimensional position of the surrounding CR of the excavator 1. When combining the plurality of distance images PTD, the three-dimensional position calculation unit 41D may define an overlapping portion OLP to indicate a three-dimensional position of either one of the distance images PTD or to indicate an average value of both three-dimensional positions.

Figure 9:
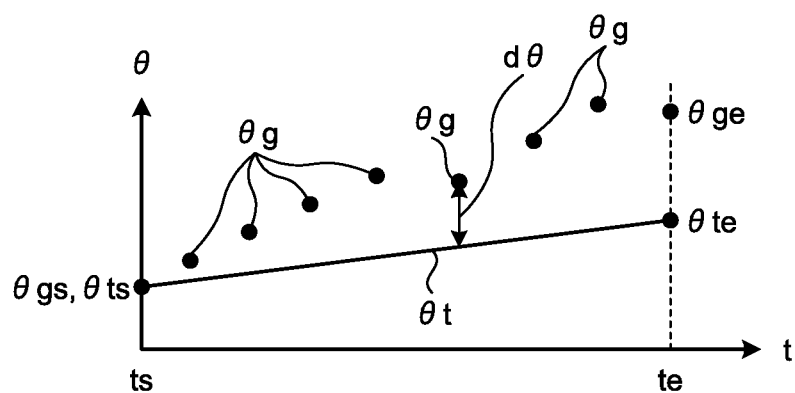
FIG. 9 is a graph illustrating correction of swing angle.

FIG. 9 is a graph illustrating correction of swing angle θ. The vertical axis in FIG. 9 represents swing angle θ, and the horizontal axis represents time t. For time, the start of swinging is ts and the end of swinging is te. A reference sign t attached to the swing angle θ means a swing angle obtained from detection values detected by the position detection device 23 and the IMU 24 and a reference sign g means a swing angle obtained from a plurality of images acquired during the swinging operation. Swing angles θg obtained from a plurality of images have a deviation dθ from a true swing angle θt due to, for example, an accuracy in extraction of the common portion PCM between the plurality of images and an error generated when calculating the swing angle θ.

Therefore, in the embodiment, the movement amount calculation unit 41B uses a swing angle θts of the swing body 3 in a state where the swing body 3 is at rest before swinging, and a swing angle θte of the swing body 3 in a state where the swing body 3 is at rest after the swinging to correct the swing angles Δg in a state where the swing body 3 is swinging. In this way, a reduction in the accuracy of the position and the attitude of the excavator 1 during swinging of the swing body 3 is suppressed, and a reduction in accuracy of a three-dimensional position of the surrounding CR of the excavator 1 obtained during the swinging of the swing body 3 is suppressed.

Another method of correcting the swing angle θ will be described. When the swing angle θ determined by the movement amount calculation unit 41B is different from a swing angle θ' through which the swing body 3 actually swings, the rate of change (inclination) in the error is constant. In such a case, the movement amount calculation unit 41B corrects the determined swing angle θ by using Formula (4). The swing angle θ' is a swing angle θ' through which the swing body 3 actually swings and is a corrected swing angle. The swing angle θ' is determined by using a swing angle θts of the swing body 3 in a state where the swing body 3 is at rest before swinging, and a swing angle θte of the swing body 3 in a state where the swing body 3 is at rest after the swinging.

$$\theta' = (\theta te - \theta ts)/(\theta ge - \theta gs) \times (\theta - \theta gs) + \theta gs \quad (4)$$

<Measurement Method According to Embodiment>

Figure 10:
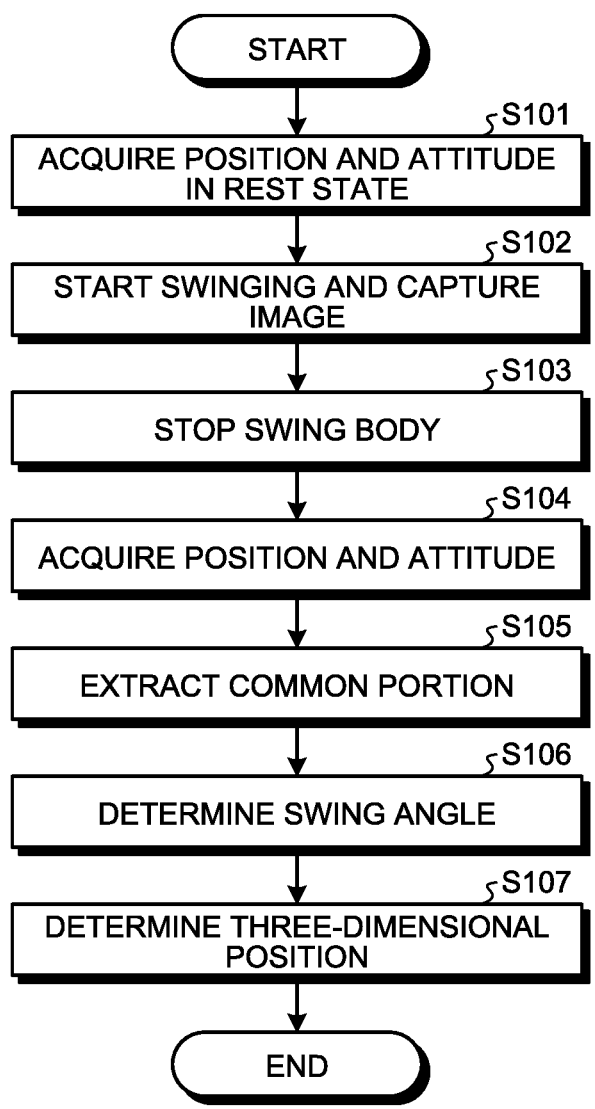
FIG. 10 is a flowchart illustrating an example of a procedure of a measurement method according to an embodiment.

FIG. 10 is a flowchart illustrating an example of a procedure of a measurement method according to an embodiment. The measurement method according to the embodiment is achieved by the measurement system 50 illustrated in FIG. 3. In three-dimensionally measuring the surrounding CR of the excavator 1, the operator of the excavator 1 turns the swing body 3 to a position from which measurement starts. When after a predetermined time has passed after the swing body 3 is stopped, the processing unit 41 of the processing device 40 notifies that continuous imaging by an imaging device 30 is allowed while the swing body 3 swings. As an example, the processing unit 41 turns on the light 33 to notify that continuous imaging is allowed. When the light 33 is turned on, the operator operates the input device 32 illustrated in FIG. 3 to give an imaging start instruction for the imaging device 30 to the processing device 40.

In Step S101, upon receiving the imaging start instruction, the processing unit 41 of the processing device 40 acquires a position of the excavator 1 from the position detection device 23 while the swing body 3 is at rest, and the IMU 24 and the attitude. In Step S102, the processing unit 41 causes the swing body 3 to start swinging and at the same time, causes at least one pair of imaging devices 30 to image the surrounding CR of the excavator 1 while the swing body 3 swings. In Step S102, the shape information SI on the surrounding CR of the excavator 1 is detected during the swinging operation of the swing body 3. In Step S102, at least one pair of imaging devices 30 outputs the captured images as the captured shape information SI to the processing unit 41.

In Step S103, when the swing body 3 swings by a predetermined angle, the processing unit 41 stops the swing body 3. In a Step S104, after a predetermined time has passed, the processing unit 41 acquires the position of the excavator 1 from the position detection device 23 while the swing body 3 is at rest, and acquires the IMU 24 and the attitude.

In Step S105, the common portion extraction unit 41A determines a common portion PCM from at least two images captured by an imaging device 30 during the swinging operation of the swing body 3. The common portion PCM is determined in the swinging direction of the swing body 3 over the entire range from the start of the swinging of the swing body 3 to the end of the swinging. That is, when a result captured before the swinging operation is 1 and a result captured after the swinging operation is n, a common portion between 1 and 2, a common portion between 2 and 3, . . . , and a common portion between n−1 and n are extracted. In Step S106, on the basis of the common portion PCM determined in Step S105, the movement amount calculation unit 41B determines the swing angle θ at timing at which at least one pair of imaging devices 30 perform imaging. In this case, the movement amount calculation unit 41B may use the swing angles θts and θte each obtained in a state where the swing body 3 is at rest before or after the swinging to correct the swing angle θg while the swing body 3 is swinging.

In Step S107, the vehicle body condition calculation unit 41C determines a three-dimensional position of the surrounding CR of the excavator 1 by using the swing angle θ obtained in Step S106, the position of the excavator determined by the position detection device 23 while the swing body 3 is at rest before swinging operation, the attitude of the excavator obtained by the IMU 24 while the swing body 3 is at rest before the swinging operation, and the images captured by the at least one pair of imaging devices 30 at a plurality of different positions during the swinging operation. In Step S107, the three-dimensional position of the surrounding CR of the excavator 1 is determined on the basis of the shape information SI being the images captured by the at least one pair of imaging devices 30. Thereafter, the three-dimensional position calculation unit 41D combines a plurality of distance images PTD including the obtained three-dimensional positions, stores the combined distance images PTD in the storage unit 42 or outputs the combined distance images PTD to an external server.

Figure 11:
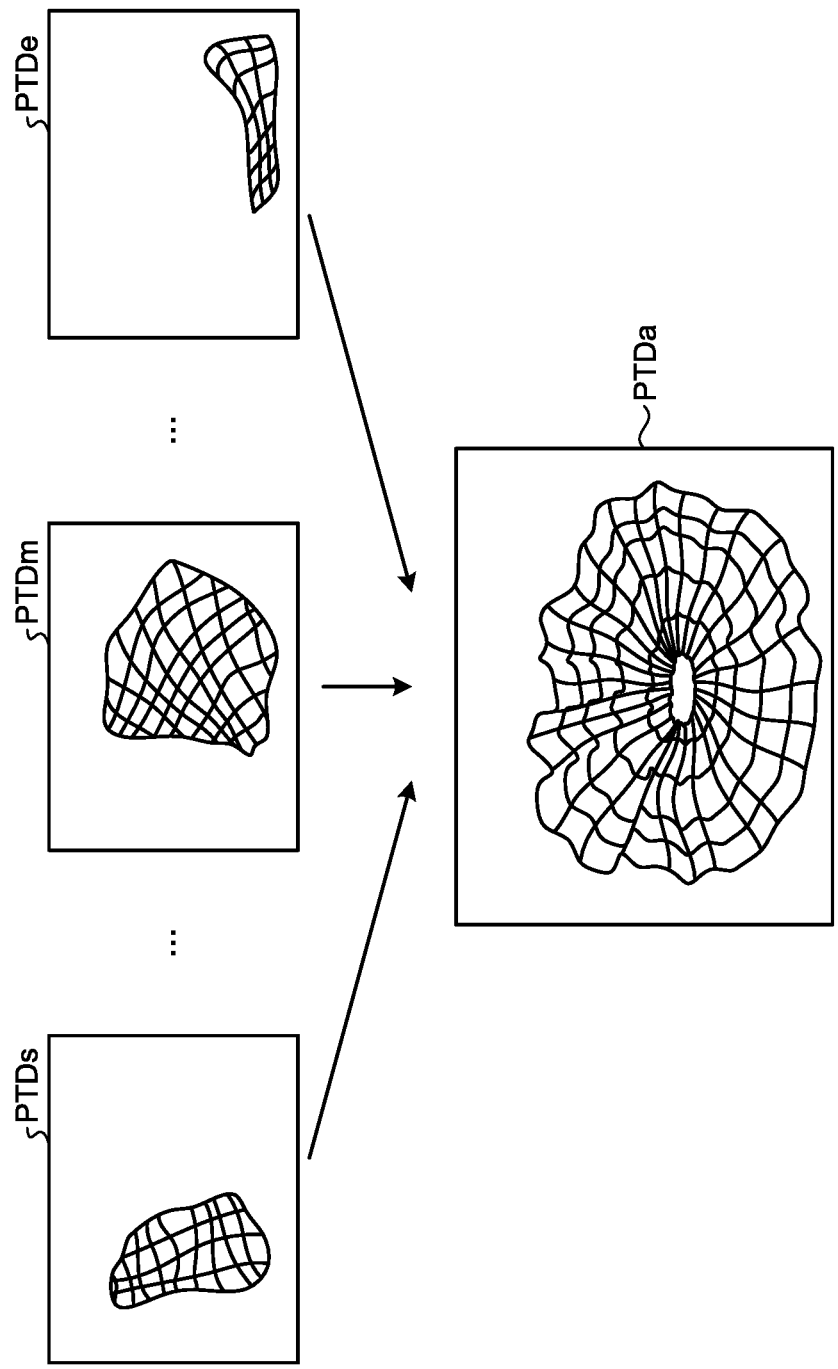
FIG. 11 is a diagram illustrating an example of combining a plurality of distance images obtained during swinging operation of the swing body and before and after the swinging operation.

FIG. 11 is a diagram illustrating an example of combining a plurality of distance images PTDs, PTDm, and PTDe obtained during the swinging operation of the swing body 3 and before and after the swinging operation. In the embodiment, the plurality of distance images PTDs, PTDm, and PTDe are obtained during the swinging operation of the swing body 3 and before and after the swinging operation. The distance image PTDs is obtained before swinging of the swing body 3, the distance image PTDm is obtained during the swinging of the swing body 3, and the distance image PTDe is obtained after the swinging of the swing body 3. The distance image PTDm may include a single distance image or a plurality of distance images.

The distance image PTDs includes a three-dimensional position around the excavator obtained before the swinging operation of the swing body 3. The distance image PTDm includes a three-dimensional position around the excavator obtained during the swinging operation of the swing body 3. The distance image PTDe includes a three-dimensional position around the excavator obtained after the swinging of the swing body 3.

The three-dimensional position calculation unit 41D illustrated in FIG. 3 combines the plurality of distance images PTDs, PTDm and PTDe obtained during the swinging operation of the swing body 3 and before and after the swinging operation. Specifically, the three-dimensional position calculation unit 41D combines height data, that is, Zg coordinates so that Xg coordinates and the Yg coordinates of the global coordinate system (Xg, Yg, Zg) in the respective three-dimensional position data. For example, the three-dimensional position calculation unit 41D combines these distance images PTDs, PTDm, and PTDe at common positions between these distance images PTDs, PTDm, and PTDe. Through this processing, the three-dimensional position around the excavator obtained before the swinging operation of the swing body 3, the three-dimensional position around the excavator obtained during the swinging operation of the swing body 3, and the three-dimensional position around the excavator obtained after the swinging of the swing body 3 are combined.

The plurality of distance images PTDs, PTDm, PTDe are combined, obtaining a distance image PTDa representing a three-dimensional shape of the surrounding of the excavator 1 within a range over which the swing body 3 swings. Obtaining the distance image PTDa enables to understand an area, the three-dimensional position of which is not calculated since the position of an imaging device 30 is failed to be measured in some positions imaged during the swinging operation of the swing body 3. Furthermore, obtaining the combined distance image PTDa enables to understand the surrounding terrain around the excavator 1. The three-dimensional position calculation unit 41D may combine a plurality of distance images PTDm obtained during the swinging operation of the swing body 3.

<Continuous Three-Dimensional Measurement During Operation of Excavator 1>

Figure 12:
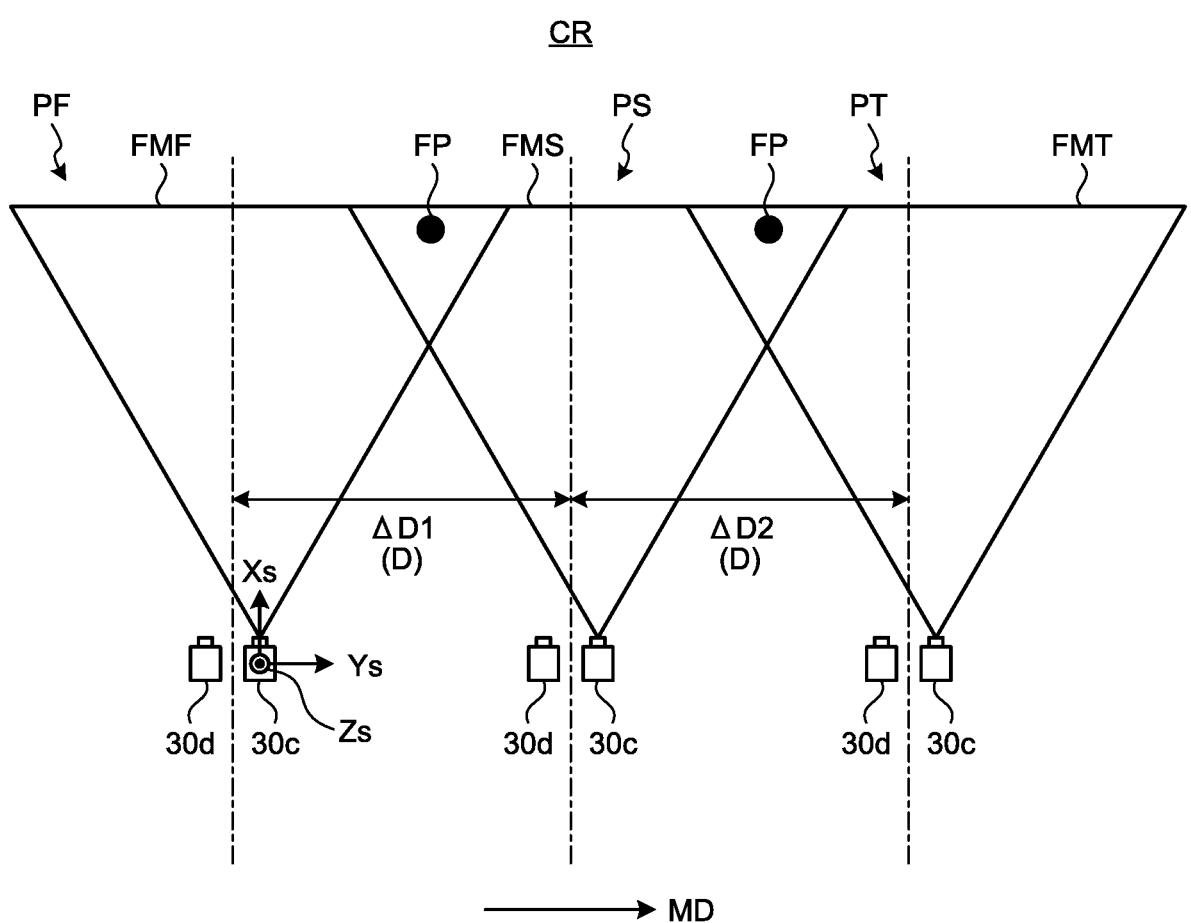
FIG. 12 is a diagram illustrating three-dimensional measurement of the surrounding of an excavator during traveling of the excavator by a measurement system according to an embodiment.

FIG. 12 is a diagram illustrating three-dimensional measurement of the surrounding CR of the excavator 1 during traveling operation of the excavator 1 by the measurement system according to an embodiment. In the embodiment, the surrounding of the excavator 1 is three-dimensionally measured during swinging operation of the swing body 3. However, in a modification, during operation of the excavator 1, for example, during traveling operation (during traveling) of the travel body 5, the surrounding of the excavator 1 is three-dimensionally measured.

The excavator 1 is at rest before the traveling operation thereof. At this time, the swing body 3 and the travel body 5 are also at rest. In this state, while the position detection device 23 and the IMU 24 stably detect and output the position and the attitude of the excavator 1, respectively, the measurement system 50 acquires the position of the excavator 1 from the position detection device 23 and the attitude of the excavator 1 from the IMU 24. This is because the position detection device 23 and the IMU 24 stably detect and output the position and the attitude of the excavator 1, respectively.

More specifically, in a state where the swing body 3 and the travel body 5 are at rest before traveling operation of the excavator 1, the measurement system 50 illustrated in FIG. 3 acquires the position of the excavator 1 from the position detection device 23 and the attitude of the excavator 1 from the IMU 24. For example, after a predetermined time has passed after the rest state of the excavator 1 and the swing body 3, the processing unit 41 illustrated in FIG. 3 determines that the position detection device 23 and the IMU 24 are in a state to stably detect and output a position and an attitude of the excavator 1, respectively.

When, after the excavator 1 rests and the swing body 3 rests after being directed to the object to be excavated which is measured, the processing device 40 of the measurement system 50, specifically, the processing unit 41 determines that the position detection device 23 and the IMU 24 are in a state to stably detect and output the position and the attitude of the excavator 1, respectively, and notifies of, for example, the state of the position detection device 23 and the IMU 24. The notification is as described above.

For example, when receiving the imaging start instruction for an imaging device 30 from the input device 32 after turning on the light 33, the processing unit 41 acquires the position and the attitude of the excavator 1 from the position detection device 23 and the IMU 24, respectively. The storage unit 42 temporarily stores the position and the attitude of the excavator 1 acquired before the traveling operation of the excavator 1. When acquiring the position and the attitude of the excavator 1, the processing unit 41 starts imaging by the imaging devices 30$a$, 30$b$, 30$c$, and 30$d$ When a travel lever, which is not illustrated, is operated by the operator, the excavator 1 starts the traveling operation. The excavator 1 may automatically start the traveling operation when the imaging start instruction is transmitted from the processing unit 41 to the imaging devices 30$a$, 30$b$, 30$c$, and 30$d$.

Each of the imaging devices 30$a$, 30$b$, 30$c$, and 30$d$ illustrated in FIG. 3, for example, performs imaging a plurality of times at predetermined periodic intervals during the traveling operation of the excavator 1 by the travel body 5 illustrated in FIG. 1 and obtains a plurality of images of the surrounding CR of the excavator 1 captured at a plurality of positions in a direction (for example, in a direction indicated by an arrow MD in FIG. 12) in which the excavator 1 travels. The storage unit 42 illustrated in FIG. 3 temporarily stores the obtained images. When the operation of the travel lever, which is not illustrated, by the operator is finished, the traveling operation of the excavator 1 stops. At this time, the swing body 3 also stops. The direction in which the excavator 1 travels does not need to be a linear direction.

After the excavator 1 stops, when the position detection device 23 and the IMU 24 illustrated in FIG. 3 stably detect and output the position and the attitude of the excavator 1, respectively, the processing unit 41 acquires the position and the attitude of the excavator 1 from the position detection device 23 and the IMU 24, respectively. The storage unit 42 temporarily stores the position and the attitude of the excavator 1 acquired by the processing unit 41. The imaging devices 30$a$, 30$b$, 30$c$ and 30$d$ image the object to be excavated, after the position detection device 23 and the IMU 24 are brought into a state to stably output the position and the attitude of the excavator 1, respectively, after the start of the traveling of the excavator 1.

The common portion extraction unit 41A of the processing unit 41 illustrated in FIG. 3 determines a common portion from a plurality of images obtained during the traveling of the excavator 1 and before and after the traveling. The common portion extraction unit 41A determines a common portion, for example, from an image captured by the imaging device 30$c$, at the first position PF, and an image captured by the imaging device 30$c$, at the second position PS during the traveling of the excavator 1. Furthermore, the common portion extraction unit 41A determines a common portion, for example, from an image captured by the imaging device 30$c$, at the second position PF, and an image captured by the imaging device 30$c$, at the third position PT during the traveling of the excavator 1.

The common portion between the image captured at the first position PF and the image captured at the second position PS corresponds to a feature portion FP in a portion where the first range FMF and the second range FMS overlap each other. The common portion between the image captured at the second position PS and the image captured at the third position PT corresponds to a feature portion FP in a portion where the second range FMS and the third range FMT overlap each other.

The common portion extraction unit 41A extracts a common portion from a plurality of images obtained during the traveling of the excavator 1 and before and after the traveling by using an algorithm, such as Harris operator, for detecting a feature point from a plurality of images. When the common portion is extracted, the movement amount calculation unit 41B of the processing unit 41 determines a movement amount $\Delta D$ ($\Delta D1$, $\Delta D2$) of an imaging device 30 on the basis of the common portion PCM. When there is a common portion between two different images, a position where the common portion is seen is changed between the two images. The amount of this change corresponds to the movement amount $\Delta D$ of the imaging device 30. The movement amount $\Delta D$ is not limited to the amount of movement in one direction as illustrated in FIG. 12, and may be a movement amount based on the six variables (a total of six variables, specifically, an Xs-direction variable, the Ys-direction variable, and the Zs-direction variable at the position of an imaging device 30, and further three variables representing the attitude of the imaging device, specifically, variables representing the rotation directions about the Xs-axis, the Ys-axis, and the Zs-axis).

As described above, for example, the movement amount D can be determined by at least one of the eight-point algorithm method, the three dimension to three dimension (3D-3D) transformation, and the bundle adjustment. When the movement amount $\Delta D$ is determined, there is no condition that the swing body 3 is constrained at the center of the swinging thereof. Therefore, when the movement amount $\Delta D$ is determined, a total of six variables, specifically, an Xs-direction variable, the Ys-direction variable, and the Zs-direction variable at the position of an imaging device 30, and further three variables representing the attitude of the imaging device, specifically, variables representing the rotation directions about the Xs-axis, the Ys-axis, and the Zs-axis are required. When the above six variables are determined by at least one of the eight-point algorithm method, the three dimension to three dimension (3D-3D) transformation, and the bundle adjustment, more common portions in a plurality of images are required than when the swing angle $\Delta\theta$ is determined.

When the movement amount $\Delta D$ is obtained, a total of six variables, specifically, the Xs-direction variable, the Ys-direction variable, and the Zs-direction variable at the position of the imaging device 30 determined at this time and the variables representing the rotation directions about the Xs-axis, the Ys-axis, and the Zs-axis are obtained. On the basis of these six variables obtained, the position and the attitude of the imaging device 30 are also obtained. When the excavator 1 travels, the movement amount ΔD of the imaging device 30 and the position and the attitude of the imaging device 30 are obtained only by the movement amount calculation unit 41B. That is, when the excavator 1 travels, the imaging device calculation unit 41E illustrated in FIG. 3 includes only the movement amount calculation unit 41B.

When the position and the attitude of the imaging device 30 during traveling of the excavator 1 are obtained, the three-dimensional position calculation unit 41D determines three-dimensional positions of the surrounding CR of the excavator 1 at a plurality of positions where the excavator 1 is traveling, by using the position and the attitude of the imaging device 30 during the traveling operation and results captured by at least one pair of imaging devices 30. For example, the position and the attitude of the imaging device 30 in the global coordinate system are obtained at a position to which the excavator 1 travels by a predetermined distance from a rest state of the excavator. Therefore, the three-dimensional position calculation unit 41D can transform a three-dimensional position included in a pixel in a distance image, from the imaging device coordinate system to the global coordinate system, by using the obtained position and attitude. In this way, the three-dimensional position calculation unit 41D can determine the three-dimensional position of the surrounding CR of the excavator 1 in the global coordinate system.

For a portion not described in the three-dimensional measurement while the excavator 1 travels, the method described in the continuous measurement during the swinging of the swing body 3 may be used.

In an embodiment, the processing device 40 achieves the three-dimensional measurement by performing the stereoscopic image processing on images captured by at least one pair of imaging devices 30, but the present invention is not limited to this. For example, images of the surrounding CR of the excavator 1 captured by at least one pair of imaging devices 30 and the position and the attitude of the excavator 1 at rest which are determined by the position detection device 23 and the IMU 24 are transmitted, for example, to an external management device. Then, the external management device may perform the stereoscopic image processing on the images of the surrounding CR of the excavator 1 and determine the swing angle θ of swinging of the swing body 3 and the position and the attitude of the excavator 1. Then, the three-dimensional positions of the surrounding CR of the excavator 1 during the swinging may be determined by using the obtained results. In this case, the management device outside the excavator 1 corresponds to the processing device 40.

In an embodiment, the work machine preferably has the swing body 3 including at least one pair of imaging devices 30, and is not limited to the excavator 1. Furthermore, in the embodiment, during the swinging operation of the swing body 3, the processing device 40 does not use the position and the attitude of the excavator 1 obtained by the position detection device 23 and the IMU 24. However, depending on the accuracy of the position detection device 23 and the IMU 24, the processing device 40 may use at least one of the position and the attitude of the excavator 1 obtained by at least one of the position detection device 23 and the IMU 24 to obtain the three-dimensional positions of the surrounding CR of the excavator 1.

In an embodiment, the swing angle θ is determined on the basis of an image captured by at least one imaging device 30, but the swing angle θ may be determined by using another method. For example, the swing angle θ may be determined by using an angle detecting sensor such as a rotary encoder for detecting the swing angle of the swing body 3. In this case, the processing unit 41 synchronizes timing at which the swing angle θ, which is a detection value from the angle detection sensor, is acquired from the angle detection sensor with timing at which at least one pair of imaging devices 30 captures the object to be excavated. In this manner, the timing at which images are captured by at least one pair of imaging devices 30 is associated with the swing angle θ of the swing body 3 at that timing.

In an embodiment, a detection device is a stereo camera including at least one pair of imaging devices 30. When capturing images with the stereo camera, timing of capturing images by respective cameras are synchronized with each other. The detection device is not limited to the stereo camera. The detection device may be a sensor, such as a time of flight (TOF) camera, which can obtain both of an image and a distance image representing three-dimensional data. The detection device may be an imaging device having one camera to obtain a distance image. The detection device may be a laser scanner.

In an embodiment, an imaging device 30 performs imaging a plurality of times at predetermined periodic intervals during the swinging operation of the swing body 3 and the swing angle θ at each imaging timing is obtained, but the present invention is not limited to this example. For example, when the swing body 3 starts swinging from the first position PF (during stopping) illustrated in FIG. 5, the processing device 40 may measure the number of common points between an image captured by an imaging device 30 at the first position PF and images captured at predetermined periodic intervals after starting the swinging so that the second position PS for determining the position of the imaging device 30 from the first position PF is determined on the basis of a change in the number of feature points. For example, as a method of determining the second position PS, the number of common points between a first image PF captured at the first position PF and subsequent images sequentially captured may be measured so that an image having common points, the number of which is not more than a predetermined value, is determined as the second image captured at the second position PS.

In an embodiment, the swing angle Δθ and the movement amount D of an imaging device 30 are determined by using, but are not limited to, at least one of the eight-point algorithm method, the 3D-3D transformation, and the bundle adjustment. For example, the swing angle Δθ of the excavator 1 and the movement amount ΔD of the imaging device 30 may be obtained by at least one of bundle adjustment method and visual-simultaneous localization and mapping (V-SLAM).

As described above, in an embodiment, while swinging the swing body to which the detection device is mounted, the surrounding shape around the work machine is detected by the detection device, and on the basis of information on the detected shape, the three-dimensional positions around the work machine are determined. As described above, an embodiment, the surrounding shape around the work machine is acquired while swinging the detection device together with the swing body, and the surrounding of the work machine is measured on the basis of the obtained shape information. Therefore, the surrounding of the work machine can be measured widely.

In an embodiment, a common portion is determined from a plurality of images captured by at least one pair of imaging devices, the swing angle of the swing body is determined on the basis of the obtained common portions, and the position and the attitude of the work machine during the swinging operation of the swing body are determined on the basis of the obtained swing angle and a position and an attitude of the work machine determined while the swing body is at rest before swinging operation thereof. Then, the three-dimensional positions around the work machine are determined by using the obtained position and attitude of the work machine and results captured by at least one pair of imaging devices at a plurality of positions in a swinging direction of the swing body. For this reason, even when a device for detecting the position and the attitude of a work machine requires a time to stably output the position and the attitude of the work machine or even when a period for outputting the position and the attitude of the work machine is long, the position and the attitude of the work machine during swinging operation are obtained from a detection result of the detection device. As a result, the surrounding shape around the work machine is detected even when the swing body is not intermittently swung but continuously swung, and the surrounding of the work machine is measured on the basis of a result of the detection. Therefore, the time required to detect the surrounding shape around the work machine is shortened. Furthermore, the surrounding shape around the work machine is detected while swinging the swing body to measure the surrounding of the work machine on the basis of a result of the detection, and the surrounding of the work machine is widely measured.

In an embodiment, the description is limited to the excavator 1, but an object to which the measurement system 50 and the measurement method are to be applied is not limited to the excavator 1. In particular, the three-dimensional measurement of the position of the work machine during traveling operation thereof by using the continuous imaging may be used in a bulldozer, wheel loader, dump truck, motor grader, and the other work machines.

The embodiments have been described above but are not limited to the above description. Furthermore, the above-mentioned components include components conceived by those skilled in the art and substantially identical components, that is, so-called equivalents. The above-mentioned components may be appropriately combined with each other. At least one of various omission, substitution, and alteration of the components may be made without departing from the spirit and scope of the invention.

REFERENCE SIGNS LIST

1 EXCAVATOR
2 WORKING EQUIPMENT
3 SWING BODY
5 TRAVEL BODY
23 POSITION DETECTION DEVICE (POSITION DETECTION UNIT)
24 ATTITUDE DETECTION UNIT (IMU)
30, 30a, 30b, 30c, 30d IMAGING DEVICE (IMAGING UNIT)
32 INPUT DEVICE
33 LIGHT
40 PROCESSING DEVICE
41 PROCESSING UNIT
41A COMMON PORTION EXTRACTION UNIT
41B MOVEMENT AMOUNT CALCULATION UNIT
41C VEHICLE BODY CONDITION CALCULATION UNIT
41D THREE-DIMENSIONAL POSITION CALCULATION UNIT
41E IMAGING UNIT POSITION CALCULATION UNIT
42 STORAGE UNIT
43 INPUT/OUTPUT UNIT
50 MEASUREMENT SYSTEM
51 HUB
CR CIRCUMFERENCE
FP FEATURE PORTION
PT DISTANCE IMAGE
SI SHAPE INFORMATION
θ SWING ANGLE

The invention claimed is:

1. A measurement system comprising:
an imaging unit mounted to a swing body of a work machine to image a shape around the work machine;
a position detection unit implemented in an antenna for global navigation satellite systems (GNSS) and configured to determine a position of the swing body;
an imaging unit position calculation unit implemented in a processor and configured to calculate a position of the imaging unit when the imaging unit performs imaging during swinging operation of the swing body; and
a three-dimensional position calculation unit implemented in a processor and configured to determine a three-dimensional position around the work machine during the imaging, on the basis of the position of the imaging unit calculated by the imaging unit position calculation unit,
wherein the imaging unit position calculation unit calculates a swing angle of the swing body of the work machine during imaging performed by the imaging unit, and calculates the position of the imaging unit when the imaging unit performs imaging during swinging operation of the swing body based on the swing angle of the swing body,
the three-dimensional position calculation unit determines a three-dimensional position of the surrounding of the work machine by using the swing angle of the swing body during the imaging, a position of the work machine determined by the position detection unit while the swing body is at rest before swinging, and an attitude of the work machine determined while the swing body is at rest before swinging, and results captured by the imaging unit at a plurality of positions in a swinging direction of the swing body,
wherein the imaging unit position calculation unit calculates the position of the imaging unit on the bases of a plurality of common portions, between a plurality of two-dimensional images captured by the imaging unit during swinging operation of the work machine, by using a least squares method.

2. The measurement system according to claim 1, further comprising
a common portion extraction unit implemented in a processor and configured to determine the common portion between the plurality of two-dimensional images captured by the imaging unit during swinging operation of the work machine,
wherein the imaging unit position calculation unit calculates the position of the imaging unit when the imaging unit performs imaging.

3. The measurement system according to claim 1, wherein the imaging unit position calculation unit uses the position of the swing body before swinging operation of the swing body or the position of the swing body after swinging operation of the swing body to correct the position of the imaging unit when the imaging unit performs imaging.

4. The measurement system according to claim 1, wherein the imaging unit position calculation unit uses a swing angle of the swing body before swinging operation of the swing body and a swing angle of the swing body after swinging operation of the swing body to correct the swing angle of the swing body during swinging operation.

5. The measurement system according to claim 1, wherein the three-dimensional position calculation unit combines a plurality of three-dimensional positions around the work machine obtained during swinging operation of the swing body.

6. A work machine comprising the measurement system according to claim 1.

7. A measurement method comprising:
providing an antenna for global navigation satellite systems (GNSS) for position detection;
calculating a position of an imaging unit during imaging performed by the imaging unit attached to a swing body mounted to a work machine during swinging operation of the swing body, wherein calculating a swing angle of the swing body of the work machine during imaging performed by the imaging device, and calculating a position of the imaging unit when the imaging unit performs imaging during swinging operation of the swing body based on the swing angle of the swing body; and
determining a three-dimensional position around the work machine during the imaging, on the basis of the calculated position of the imaging unit, a three-dimensional position calculation unit determines a three-dimensional position of the surrounding of the work machine by using the swing angle of the swing body during the imaging, a position of the work machine determined by a position detection unit while the swing body is at rest before swinging, and an attitude of the work machine determined while the swing body is at rest before swinging, and results captured by the imaging unit at a plurality of positions in a swinging direction of the swing body, wherein a imaging unit position calculation unit calculates the position of the imaging unit on the bases of a plurality of common portions, between a plurality of two-dimensional images captured by the imaging unit during swinging operation of the work machine, by using a least squares method.

8. The measurement system according to claim 3, wherein the imaging unit position calculation unit uses a swing angle of the swing body before swinging operation of the swing body and a swing angle of the swing body after swinging operation of the swing body to correct the swing angle of the swing body during swinging operation.

9. The measurement system according to claim 1, wherein the swing angle of the swing body between adjacent images is set to have a magnitude large enough to have an overlapping portion between adjacent images.

10. The measurement system according to claim 7, wherein the swing angle of the swing body between adjacent images is set to have a magnitude large enough to have an overlapping portion between adjacent images.

* * * * *